US008154841B2

(12) United States Patent
Allen et al.

(10) Patent No.: US 8,154,841 B2
(45) Date of Patent: Apr. 10, 2012

(54) CURRENT ZERO CROSS SWITCHING RELAY MODULE USING A VOLTAGE MONITOR

(75) Inventors: Douglas E. Allen, Lindon, UT (US); David Smith, Lindon, UT (US)

(73) Assignee: Legrand Home Systems, Inc., Middletown, PA (US)

( * ) Notice: Subject to any disclaimer, the term of this patent is extended or adjusted under 35 U.S.C. 154(b) by 657 days.

(21) Appl. No.: 12/191,641

(22) Filed: Aug. 14, 2008

(65) Prior Publication Data

US 2009/0027824 A1 Jan. 29, 2009

Related U.S. Application Data

(63) Continuation-in-part of application No. 10/934,776, filed on Sep. 3, 2004, now abandoned.

(60) Provisional application No. 60/500,147, filed on Sep. 3, 2003.

(51) Int. Cl.
*H02H 3/00* (2006.01)
*H02H 9/00* (2006.01)

(52) U.S. Cl. ........ 361/170; 361/160; 361/93.6; 361/139

(58) Field of Classification Search .................. 361/170, 361/160, 93.6, 139
See application file for complete search history.

(56) References Cited

U.S. PATENT DOCUMENTS 3,284,667 A 11/1966 Harris et al.
3,689,886 A 9/1972 Durkee
3,697,821 A 10/1972 Johnson
3,706,914 A 12/1972 Van Buren
3,707,682 A 12/1972 Harris
3,746,923 A 7/1973 Spira et al.
3,784,875 A 1/1974 Baker et al.
3,868,546 A 2/1975 Gilbreath et al.
3,868,547 A 2/1975 Kappenhagen et al.
3,940,660 A 2/1976 Edwards
4,057,751 A 11/1977 Bonsignore et al.

(Continued)

FOREIGN PATENT DOCUMENTS

EP 0 040 339 11/1981

(Continued)

OTHER PUBLICATIONS

Bybee, "Build Reacts: The Radio-Electronics Advanced Control System," Radio-Electronics, vol. 59, No. 10, p. 65, Oct. 1988.

(Continued)

*Primary Examiner* — Jared Fureman
*Assistant Examiner* — Zeev V. Kitov
(74) *Attorney, Agent, or Firm* — McCcarter & English, LLP

(57) ABSTRACT

Assemblies, systems, and methods which prolong relay life by dynamically compensating the make and break contact timing between the contact points of the relay and a zero crossing point of the power supply's waveform are provided according to the present disclosure. The life cycle of the relay components are dramatically increased through the use of these assemblies, systems, and methods due to a decrease in arcing and other physically damaging phenomena between the contacts of the relay. The present disclosure also provides for assemblies, systems, and methods whereby a processor analyzes the inductive kickback effect in the relay load voltage signal and dynamically adjust the relay open time such that the inductive kickback effect is minimized. In exemplary embodiments, the systems/methods provided herein advantageously adjust the relay open time such that the relay switching time corresponds with current zero cross and do so without requiring complicated current monitoring components.

14 Claims, 16 Drawing Sheets

U.S. PATENT DOCUMENTS

| | | | |
|---|---|---|---|
| 4,060,735 | A | 11/1977 | Pascucci et al. |
| 4,095,139 | A | 6/1978 | Symonds et al. |
| 4,156,866 | A | 5/1979 | Miller |
| 4,163,218 | A | 7/1979 | Wu |
| 4,187,528 | A | 2/1980 | Morriss |
| 4,196,388 | A | 4/1980 | Weller et al. |
| 4,200,862 | A | 4/1980 | Campbell et al. |
| 4,203,096 | A | 5/1980 | Farley et al. |
| 4,206,443 | A | 6/1980 | Britton |
| 4,225,808 | A | 9/1980 | Saraceni |
| 4,246,494 | A | 1/1981 | Foreman et al. |
| 4,274,045 | A | 6/1981 | Goldstein |
| 4,277,727 | A | 7/1981 | LeVert |
| 4,300,090 | A | 11/1981 | Weber |
| 4,334,171 | A | 6/1982 | Parman et al. |
| 4,336,464 | A | 6/1982 | Weber |
| 4,359,670 | A | 11/1982 | Hosaka et al. |
| 4,381,456 | A | 4/1983 | Saito et al. |
| 4,388,567 | A | 6/1983 | Yamazaki et al. |
| 4,390,814 | A | 6/1983 | Peek |
| 4,392,187 | A | 7/1983 | Bornhorst |
| 4,395,660 | A | 7/1983 | Waszkiewicz |
| 4,484,190 | A | 11/1984 | Bedard |
| 4,489,385 | A | 12/1984 | Miller et al. |
| 4,504,778 | A | 3/1985 | Evans |
| 4,521,843 | A | 6/1985 | Pezzolo et al. |
| 4,523,132 | A | 6/1985 | Christiansen et al. |
| 4,524,288 | A | 6/1985 | Schimmelpennink et al. |
| 4,560,909 | A | 12/1985 | Peil |
| 4,563,592 | A | 1/1986 | Yuhasz et al. |
| 4,628,440 | A | 12/1986 | Thompson |
| 4,638,299 | A | 1/1987 | Campbell |
| 4,644,320 | A | 2/1987 | Carr et al. |
| 4,680,536 | A | 7/1987 | Roszel et al. |
| 4,684,822 | A | 8/1987 | Angott |
| 4,689,547 | A | 8/1987 | Rowen et al. |
| 4,691,341 | A | 9/1987 | Knoble et al. |
| 4,703,306 | A | 10/1987 | Barritt |
| 4,716,409 | A | 12/1987 | Hart et al. |
| 4,719,446 | A | 1/1988 | Hart |
| 4,745,351 | A | 5/1988 | Rowen et al. |
| 4,792,731 | A | 12/1988 | Pearlman et al. |
| 4,797,599 | A | 1/1989 | Ference et al. |
| 4,823,069 | A | 4/1989 | Callahan et al. |
| 4,878,010 | A | 10/1989 | Weber |
| 4,948,987 | A | 8/1990 | Weber |
| 4,995,053 | A | 2/1991 | Simpson et al. |
| 5,017,837 | A | 5/1991 | Hanna et al. |
| 5,099,193 | A | 3/1992 | Moseley et al. |
| 5,113,498 | A | 5/1992 | Evan et al. |
| 5,128,855 | A | 7/1992 | Hilber et al. |
| 5,175,477 | A | 12/1992 | Grissom |
| 5,187,655 | A | 2/1993 | Post et al. |
| 5,225,765 | A | 7/1993 | Callahan et al. |
| 5,361,184 | A * | 11/1994 | El-Sharkawi et al. ....... 361/93.6 |
| 5,373,411 | A | 12/1994 | Grass et al. |
| 5,473,202 | A | 12/1995 | Mudge et al. |
| 5,523,631 | A | 6/1996 | Fishman et al. |
| 5,555,150 | A | 9/1996 | Newman, Jr. |
| 5,563,459 | A | 10/1996 | Kurosawa et al. |
| 5,638,296 | A | 6/1997 | Johnson et al. |
| 5,905,442 | A | 5/1999 | Mosebrook et al. |
| 5,982,103 | A | 11/1999 | Mosebrook et al. |
| 6,091,205 | A | 7/2000 | Newman, Jr. et al. |
| 6,233,132 | B1 * | 5/2001 | Jenski ........................... 361/160 |
| 6,331,687 | B1 | 12/2001 | Dunk et al. |
| 6,359,562 | B2 | 3/2002 | Rubin |
| 6,646,843 | B1 | 11/2003 | Newman, Jr. et al. |
| 6,768,615 | B2 * | 7/2004 | Liu ................................... 361/2 |
| 6,967,565 | B2 | 11/2005 | Lingemann |

FOREIGN PATENT DOCUMENTS

| | | |
|---|---|---|
| EP | 0 361 734 | 4/1990 |
| EP | 0 435 224 | 7/1991 |
| EP | 0 558 349 | 9/1993 |
| GB | 2 076 180 | 11/1981 |
| GB | 2 097 918 | 11/1982 |

OTHER PUBLICATIONS

Cooper, "X10 FAQ html version. Based on the X10 FAQ version 1.08," Jan. 8, 1995.

Horowitz et al., The Art of Electronics, 1989, Cambridge University Press, $2^{nd}$ Ed., pp. 595-598.

House, "CEBus for the Masses," Home Automation & Building Control, pp. 61-68, Apr. 1995.

Intellon Corporation, "Intellon HomePlug7 Family of Products," 2005.

Parks et al., X-10 Ltd. Myths and Reality: The Facts Behind the Company and the Technology, Parks Associates, Dallas, 1994.

Price, "Product Development Flow Using Domosys HeadStart Suite," www.hometoys.com/htinews/aug99/articles/domosys/domosys.htm, Aug. 1999.

PR Newswire, "Cyberhouse Software Wins Mark of Excellence Award from Home Automation Association," PR Newswire, p. 325, Mar. 25, 1996.

Schofield, "Home Automation Takes Off: Intellon products support a 'home electronic highway,'" Design News, pp. 84-87, Apr. 10, 1995.

Stauffer, "The Smart House System," The Computer Applications Journal, vol. 31, pp. 14-23, Feb. 1993.

Strassberg, "Home Automation Buses: Protocols really hit home," EDN, pp. 69-80, Apr. 13, 1995.

www.unitysystemshomemanager.com, "Lighting & Appliance Control," www.unitysystemshomemanager.com, at least as early as Jun. 23, 2004.

Wacks, "The Impact of Home Automation on Power Electronics," IEEE, pp. 3-9, 1993.

* cited by examiner

FIG.3B1

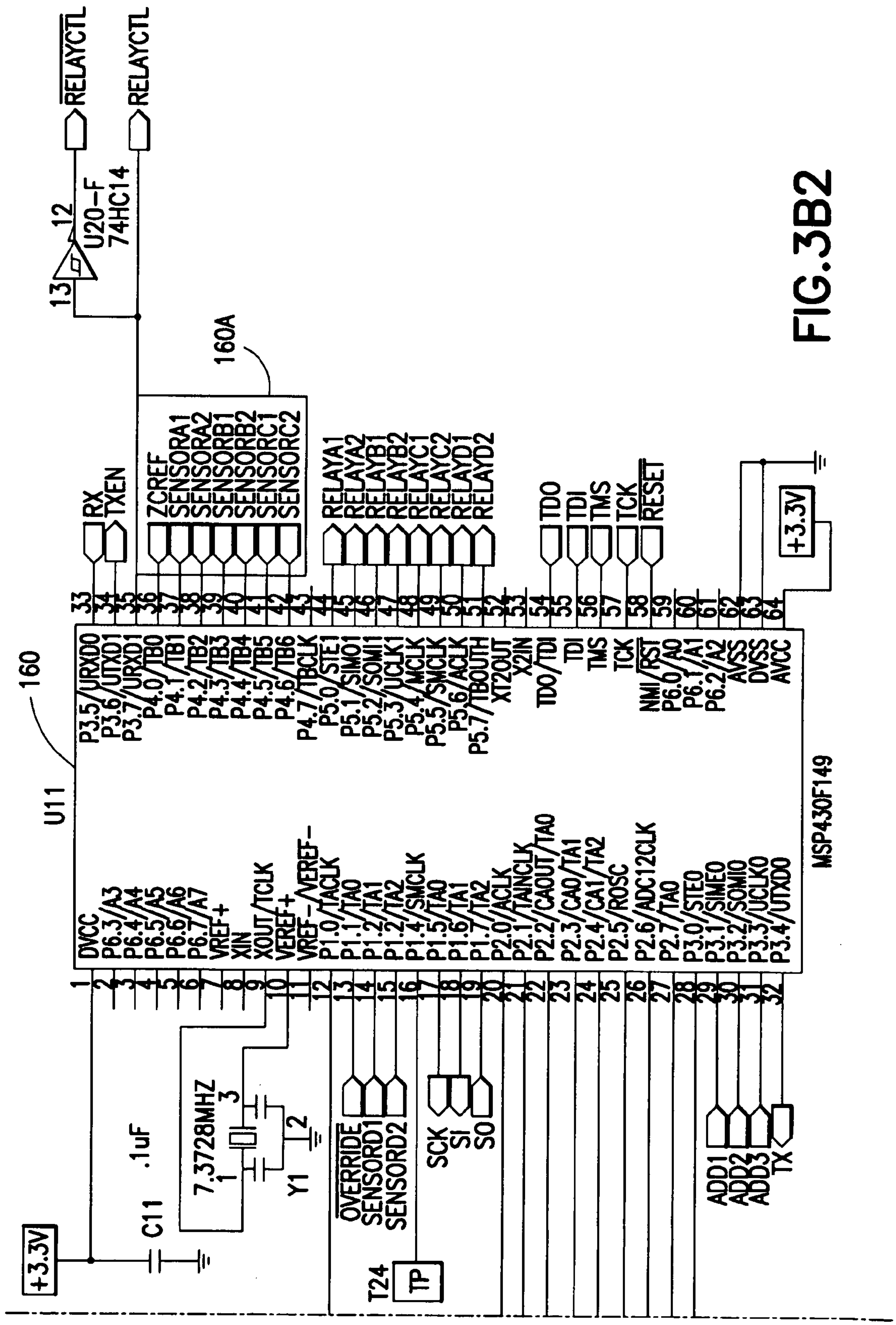
FIG.3B2

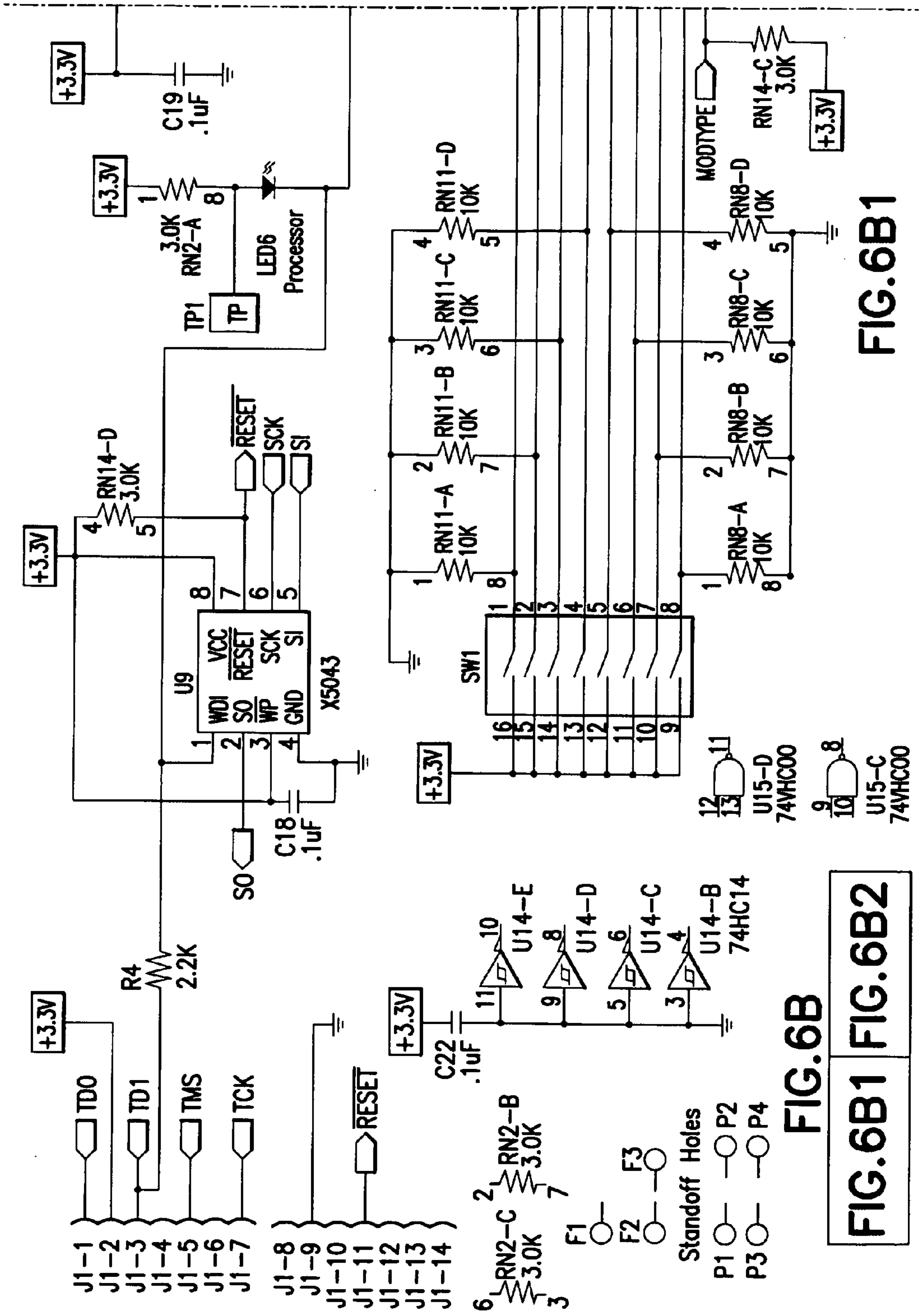
FIG.6B1

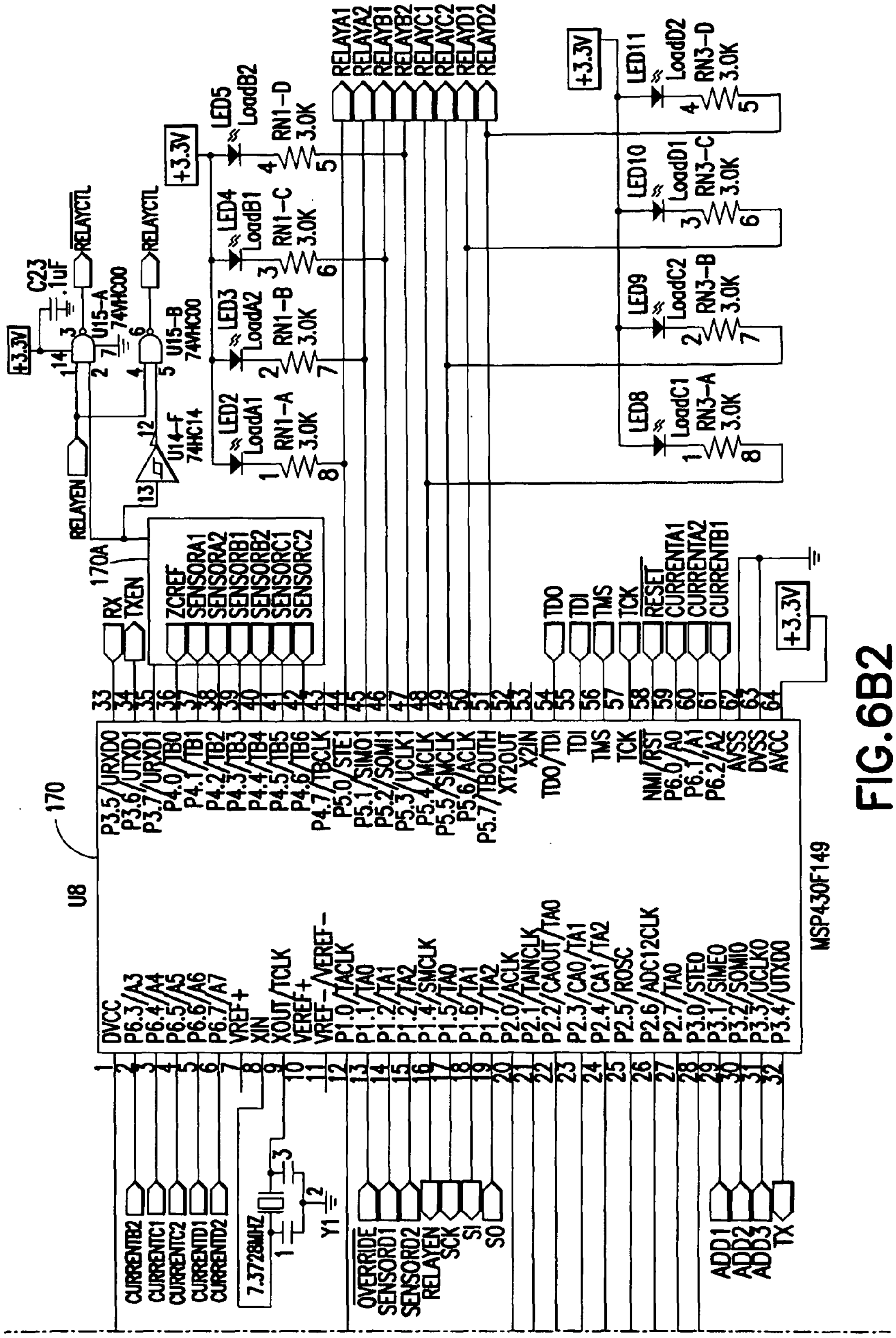
FIG.6B2

CURRENT ZERO CROSS SWITCHING RELAY MODULE USING A VOLTAGE MONITOR

CROSS-REFERENCE TO RELATED APPLICATIONS

The present application is a continuation-in-part of and claims priority to U.S. patent application Ser. No. 10/934,776 filed Sep. 3, 2004 now abandoned, entitled "Zero Cross Switching Relay Module," which claims priority to provisional application Ser. No. 60/500,147, filed Sep. 3, 2003, both of which are hereby incorporated in their entireties, including but not limited to those portions that specifically appear hereinafter.

BACKGROUND

1. Technical Field

The present disclosure relates generally to electrical relays, and more particularly, but not necessarily entirely, relays that switch at specified instances.

2. Background Art

Relays are used as switches to control power to electrical devices. A relay may be defined as an electromechanical switch operated by a flow of electricity in one circuit and controlling the flow of electricity in another circuit. A relay may consist basically of an electromagnet with a soft iron bar, called an armature, held close to it. A movable contact is connected to the armature in such a way that the contact is held in its normal position by a spring. When the electromagnet is energized, it exerts a force on the armature that overcomes the pull of the spring and moves the contact so as to either complete or break a circuit. When the electromagnet is de-energized, the contact returns to its original position. Variations on this mechanism are possible: some relays have multiple contacts; some are encapsulated; some have built-in circuits that delay contact closure after actuation; some, as in early telephone circuits, advance through a series of positions step by step as they are energized and de-energized.

Since the actuation of a relay requires the physical movement of one of the contact electrodes, there may be some delay from the issuance of a close command until the magnetic field has build to a sufficient level to begin movement of the contact electrodes by overcoming the spring force. This delay makes it difficult to precisely time the actual opening or closing of the electrodes.

Relays are often used to switch alternating current (AC). AC occurs when charge carriers in a conductor or semiconductor periodically reverse their direction of movement. Household utility current in the U.S. and some other countries is AC with a frequency of 60 hertz (60 complete cycles per second), although in other countries it is 50 Hz.

An AC waveform may be sinusoidal, square, or sawtooth-shaped. Some AC waveforms are irregular or complicated. An example of sine-wave AC is common household utility current (in the ideal case). One characteristic of the AC waveform is that it crosses zero when reversing directions. At this zero crossing point, there is no current flowing.

The voltage of an AC power source also changes from instant to instant in time. The AC voltage changes is also a sinusoidal wave that over time starts at zero, increases to a maximum value, then decreases to a minimum value, and repeats.

In applications where relays are repeatedly switched, the life of the relay may be cut short by arcs (a luminous bridge of ionized gas) that form across the relay contacts when switched. The time period in which the arc flows is determined by many factors including the mechanical bounce of the contracts upon closure, the distance between the contact electrodes, the magnitude of the current flowing, as well as the level of ionization of the air in the gap between contact electrodes.

These arcs may cause pits and welds to accumulate on the contact surface which diminish the useful life of the relay. The pits are formed through a small portion of the contact electrode melting or vaporizing due to the extreme heat of the arc. The extreme heat may also weld the contacts together, thereby making the relay unusable. In addition, these arcs may cause a build up of carbon deposit on the contacts, which, over time, accumulate to form a high resistance contact between the contacts, thus reducing the current flow to the load and making the relay less efficient.

Such arcs can generally, be suppressed by eliminating the voltage difference or current flow across relay contacts while switching the relay. This has been accomplished in the past by turning the load on with a triac while switching the relay on or off. Unfortunately, these triacs provide a path bypassing the high level of isolation offered by electromechanical relays. Moreover, triacs will also often fuse from the high inrush currents characteristic of certain loads.

In recent years some attempts have been made to control the physical opening and closing of an electromechanical relay at a point as close as possible to zero voltage in the sine waveform. For example, one technique is based on an assumption that zero voltage points correspond with zero current points. A complicating factor, however, is that in AC circuits, inductors and capacitors generally introduce phase shifts between voltage and current across a given component. Thus, in some instances, voltage zero cross is out of phase with current zero cross. In such instances, opening the relay at a zero voltage would not effectively prevent arcing.

Furthermore, other methods of determining current zero cross generally involve using an expensive current transformer with associated circuitry in order to dynamically measure the load current for a relay. The use of such current monitors, however, is generally both complicated and expensive.

These and other disadvantages and/or limitations are addressed and/or overcome by the assemblies, systems, and methods of the present disclosure.

SUMMARY

In exemplary embodiments, the present disclosure provides for assemblies, systems, and methods for dynamically adjusting relay switching times to correspond with current zero cross using a voltage monitor or the like coupled with a processor. Thus, the assemblies, systems, and methods provided herein advantageously determine the relay open time for the relay wherein the relay open time corresponds to the time delay between when an open control signal is sent and current zero cross. In exemplary embodiments, the assemblies, systems, and methods advantageously determine the relay open time by utilizing a low-cost voltage monitor or the like to measure the voltage at the load side of the relay, without a need for transformers or similarly complex/expensive current monitoring components, thereby providing a significant commercial advantage as a result. Typically, the voltage signal is continuously analyzed by the processor in order to dynamically determine the relay open time, as later discussed herein. In exemplary embodiments, additional circuitry may be included to modify the voltage signal prior to and for the benefit of facilitating analysis by the processor; e.g., the voltage signal may be filtered, normalized, and/or scaled.

According to the present disclosure, a novel correlation technique is used to determine the relay open time such that switching corresponds with the current zero-cross. In general, when current is interrupted to an inductive load the magnetic field of the load will cause the voltage on the load side of the relay to spike until an arc is formed whereby the energy in the load's magnetic field is dissipated. This sudden change of voltage is sometimes referred to as inductive kickback. In exemplary embodiments of the present disclosure, a processor analyzes the inductive kickback effect to the load voltage signal in order to dynamically adjust relay open times such that inductive kickback is minimized. Thus, the processor analyzes the load voltage signal data, e.g., for time subsequent to the last line voltage zero cross, amplitude, etc., and the processor also adjusts the relay open time such that the next relay open more accurately approximates relay switching at a zero current point. Each time the relay is opened the resulting kickback is analyzed and the timing is adjusted. By checking the inductive kickback each time the relay is opened the circuit can dynamically adjust for changes in the operation of the relay and load. In general, minimal inductive kickback indicates that the relay open time is optimally configured to correspond with current zero cross. As such, a complex and/or expensive current monitor is not necessary since inductive kickback can be monitored and measured using a voltage monitor, thereby providing a significant commercial advantage as a result.

Additional features, functions and benefits of the disclosed apparatus, systems and methods will be apparent from the description which follows, particularly when read in conjunction with the appended figures.

BRIEF DESCRIPTION OF THE DRAWINGS

To assist those of ordinary skill in the art in making and using the disclosed assemblies, systems, and methods, reference is made to the appended figures, wherein.

DESCRIPTION OF EXEMPLARY EMBODIMENT(S)

According to the present disclosure, advantageous assemblies, systems, and methods are provided for dynamically adjusting switching times in order to reduce arcing. More particularly, the disclosed assemblies, systems, and methods generally involve monitoring component waveforms, e.g., voltage on the load side of a relay, and opening/closing the relay at or near a zero crossing, e.g., zero current. In general, dynamic readings of prior actuations are used to anticipate the actuation time for each subsequent operation of the relay. In exemplary embodiments, the dynamic readings are continuously updated each time the relay is actuated to thereby optimize the characteristic switching time for each individual relay and adjust for any variations in switching time over the life of the relay.

Figure 1:
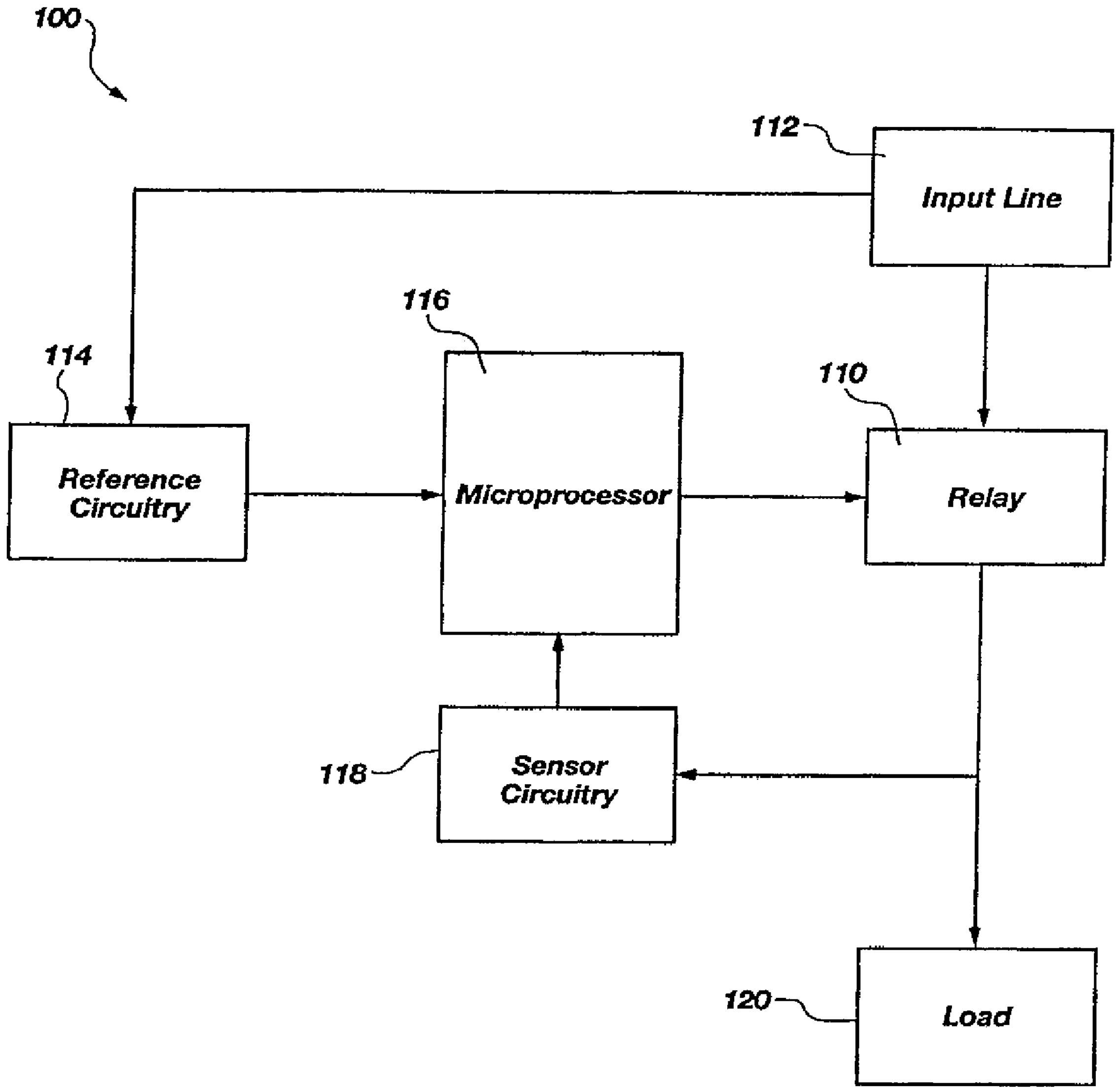
FIG. 1 is a block diagram showing an exemplary system for zero cross switching according to the present disclosure.

Referring now to FIG. 1 there is shown generally an exemplary system 100 for zero cross switching in block diagram format. The system 100 typically comprises a relay 110, an input line 112, a reference circuit 114, a microprocessor 116, a sensor circuit 118, and a load 120. The input line 112 typically comprises an alternating current (AC) which may be at any selected frequency. The input line 112 is the source of power controlled by the relay 110.

The relay 110 may be any type as is commonly used in the art to provide an electromechanical switch between an input line 112 and a load 120. Typically, a relay 110 may comprise a drive coil, a movable contact electrode, and a stationary contact electrode (not explicitly shown in the figure). The drive coil is energized to create a magnetic field which moves the movable contact electrode into contact with the stationary contact electrode to complete an electrical circuit between the input line 112 and the load 120. When the drive coil is switched off or on, the movable contact electrode may take several milliseconds to open or close. The exact switching time varies from relay to relay and can change for a particular relay over time. More sophisticated relays designs include both a drive open and a drive close coil, requiring the application of an electrical drive signal to both open and close the relay. Other relays have both normal open and normal closed contacts. Other designs as are known in the art and all have application within the scope of the present disclosure.

In order to switch the relay 110 at the zero cross, an independent sensor circuit 118 is used for the relay 110 to time the characteristic delay that the relay 110 experiences to open or close its contacts. The sensor circuit 118 provides the microprocessor 116 with an output signal. From the output signal, it can be determined the difference in time from the zero cross of the monitored waveform (either voltage or current) and the opening and closing of the relay 110. The output signal may comprise a pulsed signal component. The sensor circuit 118 may selectively monitor either voltage or current, or a combination of both.

The reference circuit 114 is also connected to the input line 112. The reference circuit 114 provides the microprocessor 116 a reference signal for timing the start of a switch.

The microprocessor 116 provides timing/control and adjustment to ensure that the relay 110 switches during a zero crossing or as close thereto as possible. In addition, the microprocessor 116 may be any logic circuit such as a programmable logic array, custom circuit, or other appropriate circuitry known in the art for processing logic and timing signals. In the microprocessor 116 are the appropriate input/output circuitry required for the described implementation of the present disclosure.

Figure 2:
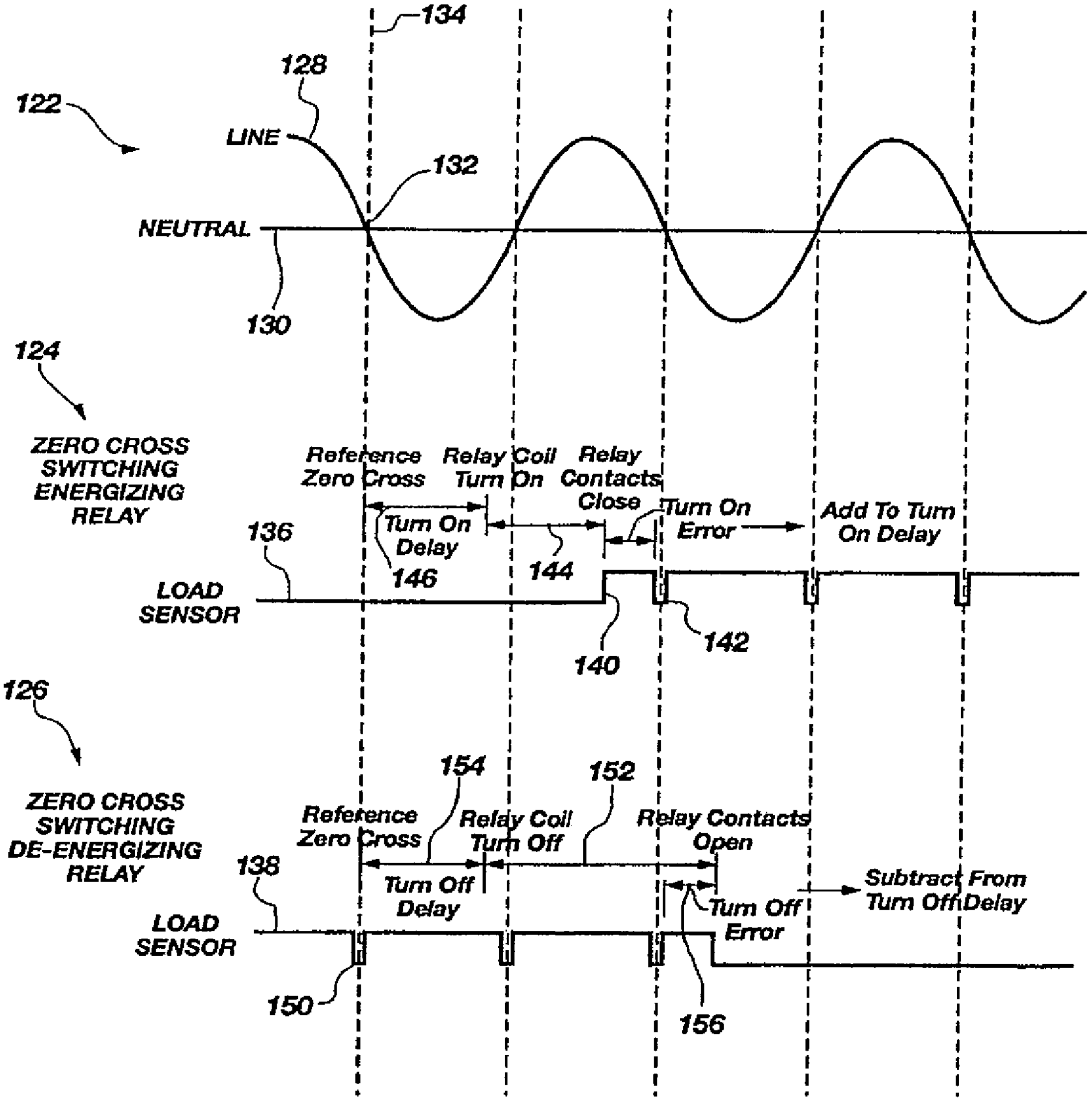
FIG. 2 is a diagram showing several output signals over time for the system of FIG. 1.

Referring now to FIG. 2 a composite timing diagram is depicted showing graph 122 illustrating the input line 112 reference waveform 128, graph 124 illustrating the sensor circuitry 118 output 136 for zero cross switching when energizing the relay, and graph 126 illustrating the sensor circuitry 118 output 138 for zero cross switching when de-energizing the relay. All of the graphs show how its respective signal changes (vertical axis) over time (horizontal axis). Both FIGS. 1 and 2 will be referred to as the waveforms shown in FIG. 2 are described.

Graph 122 illustrates a reference waveform 128 for the input line 112. For zero voltage switching (when closing the relay contacts, graph 124, the reference waveform 128 may represent the voltage of the power supply 112. For zero current switching (when opening the relay contacts), graph 126, the reference waveform 128 may represent the current of the power supply 112.

The reference waveform graph 122 shows a plurality of zero crossing points 132. This is when the reference waveform 128 crosses the neutral (or zero) line 130. The zero crossing points 132 are when the voltage or current is zero, as the case may be. A series of vertical lines, one of which is indicated at 134, allows the zero crossing points 132 to be identified on the other two graphs 124 and 126. The reference waveform graph 114 may represent the output from the reference circuit 114 to the microprocessor 116.

When the load 120 is being switched on or off, the microprocessor 116 will wait for a zero crossing point 132, and preferably, but not necessarily, for the next zero crossing point 132, to begin the switching process. From this zero cross crossing point 132, the microprocessor 116 will wait an additional delay time before turning the coil on or off to switch the relay 110. This delay time is characteristic of the relay 110 it is switching and is measured to ensure that the relay 110 will make or break contact at exactly the zero crossing point 132 of the input line 112.

For zero voltage switching (that is the relay contacts are closed at or near a zero voltage cross point), graph 124, the output 136 from the sensor circuitry 118 to the microprocessor 116 begins at a low state. This may imply that the relay 110 is open and that no power is being supplied to the load 120. When the relay 110 is closed, the output 136 switches to a high state as can be seen with the rising edge marked with reference numeral 140. In addition, the sensor circuitry 118 is such that the output 136 also drops to a low state momentarily when the reference waveform 128 has a zero crossing point 132 as can be seen with the pulse marked with reference numeral 142.

Relay turn on delay time 144 represents the time it takes for the relay 110 to close after the microprocessor 116 energizes the coil. Turn on delay time 146 represents the time the microprocessor delays energizing the coil from a zero crossing point 132. Turn on error time 148 represents the time from when the relay 110 actually closes to the next zero crossing point 132.

The microprocessor 116 is programmed to begin the switching process at a zero cross point 132. Since it is desired that the relay 110 actually closes on a subsequent zero crossing point 132, the microprocessor 116 delays energizing the coil of the relay 110 for the turn on delay time 146. The turn on delay time 146 is adjusted by the microprocessor 116 dynamically pursuant to the turn on error time 148, generally after each time the relay 110 is actuated.

When the turn on error time 148 is equal to zero or as close to there as possible, then the microprocessor 116 knows that the coil on the relay 110 is actually closing on a zero crossing point 132. This is when the time duration of the first high state will be equal to the one half of the cycle length of the input line.

For zero current switching (that is the relay contacts are opened at or near a zero current cross point), shown in graph 126, the sensor circuitry 118 output 138 is at a high state, except that at every zero crossing point 132 the output 138 momentarily switches to a low state, as is shown at 150. The microprocessor 116 is programmed to begin the switching off process on a zero crossing point 132. Because it is desired to have the relay 110 open on a zero crossing point 132, the microprocessor 116 delays de-energizing the coil of the relay 110 for a turn off delay time 154. Once the microprocessor 116 actually turns the coil off, the relay turn off time 152 is the time it actually takes the relay 110 to open. The turn off error time 156 is the time from a zero crossing point 132 until the relay 110 actually opens. The turn off delay time 154 is adjusted dynamically by the microprocessor 116 pursuant to the turn off. error time 156 after each time the relay 110 is actuated.

When the turn off error time 156 is equal to zero or as close to there as possible, then the microprocessor 116 knows that the coil on the relay 110 is actually opening on a zero crossing point 132. This is when the time duration of the last high state will be equal to the one half of the cycle length of the input line. Most advantageously, various implementations of the present disclosure can be arrived at using the information provided herein to greatly increase the useful life of a relay.

Figure 3A:
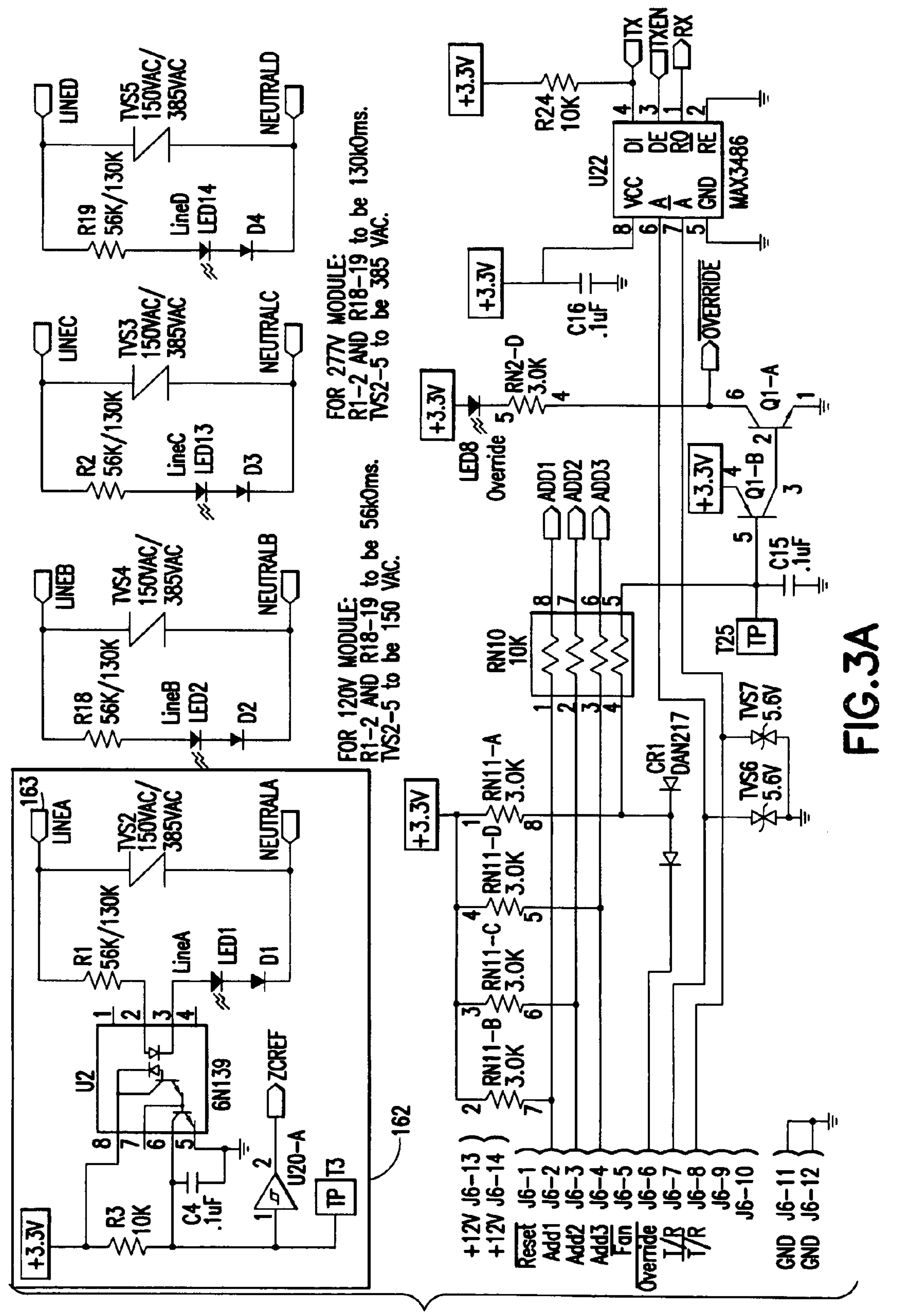
FIGS. 3-5 are schematics of a first exemplary embodiment of the system in FIG. 1.
Figure 3B:
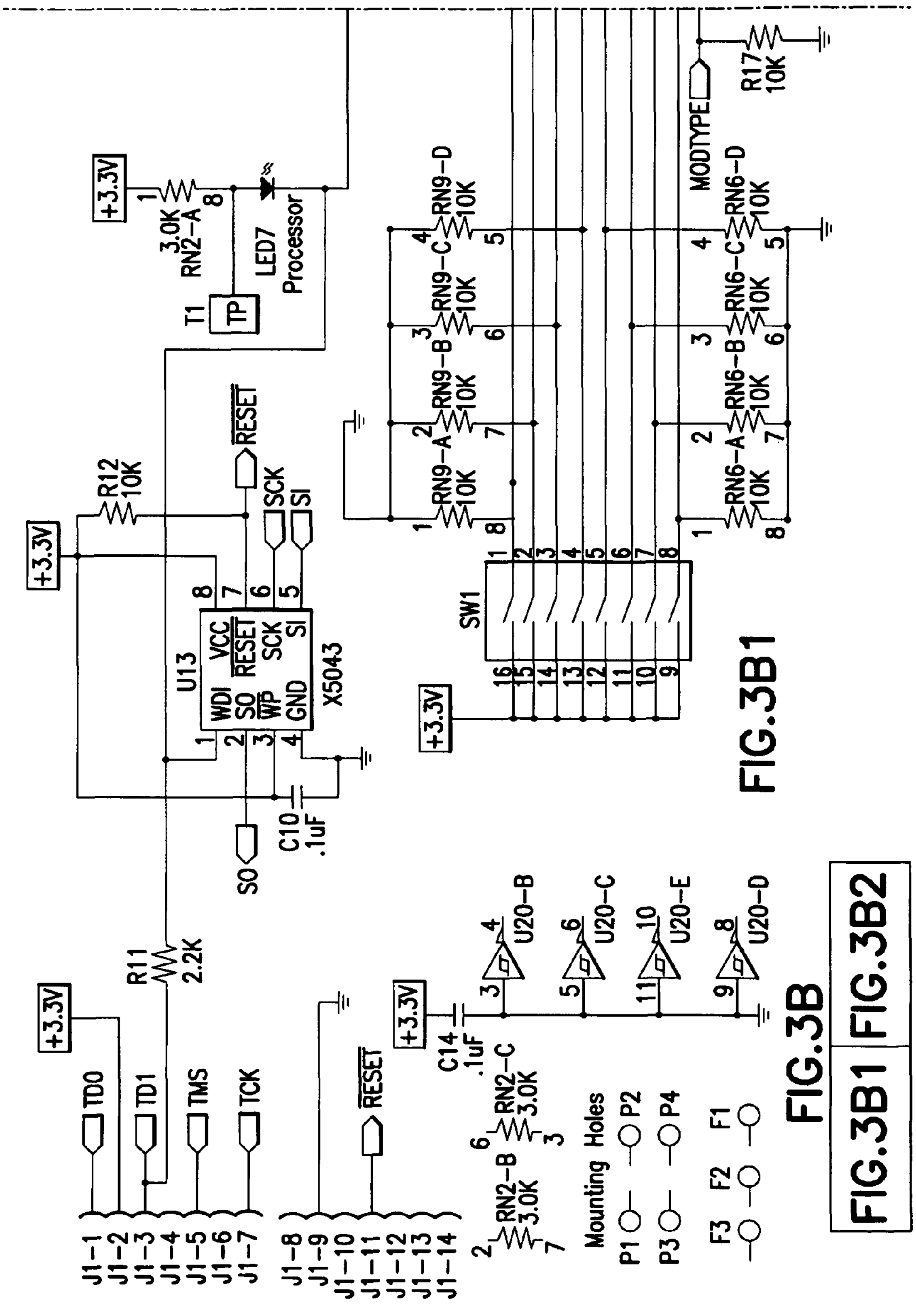
Figure 4A:
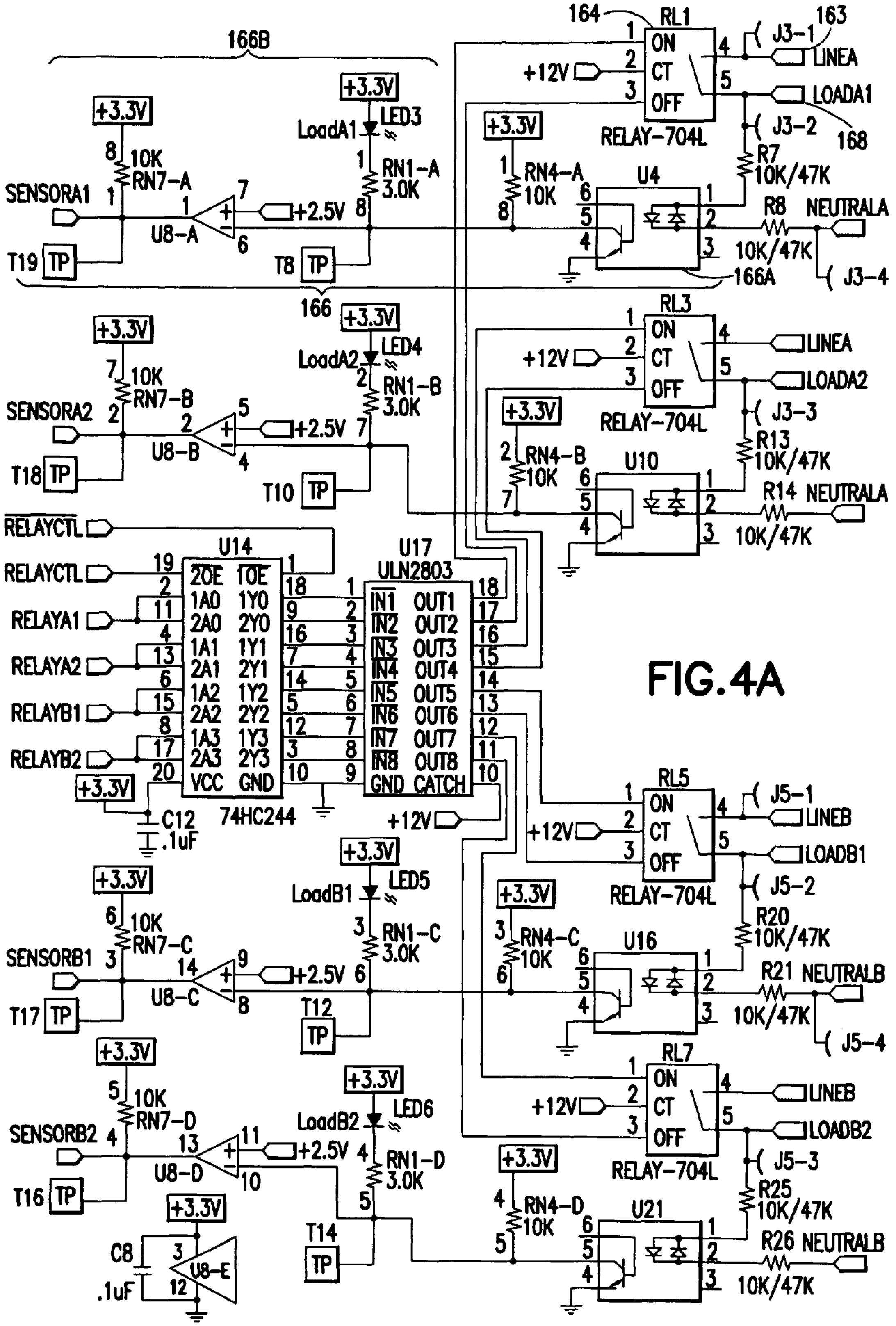
Figure 4B:
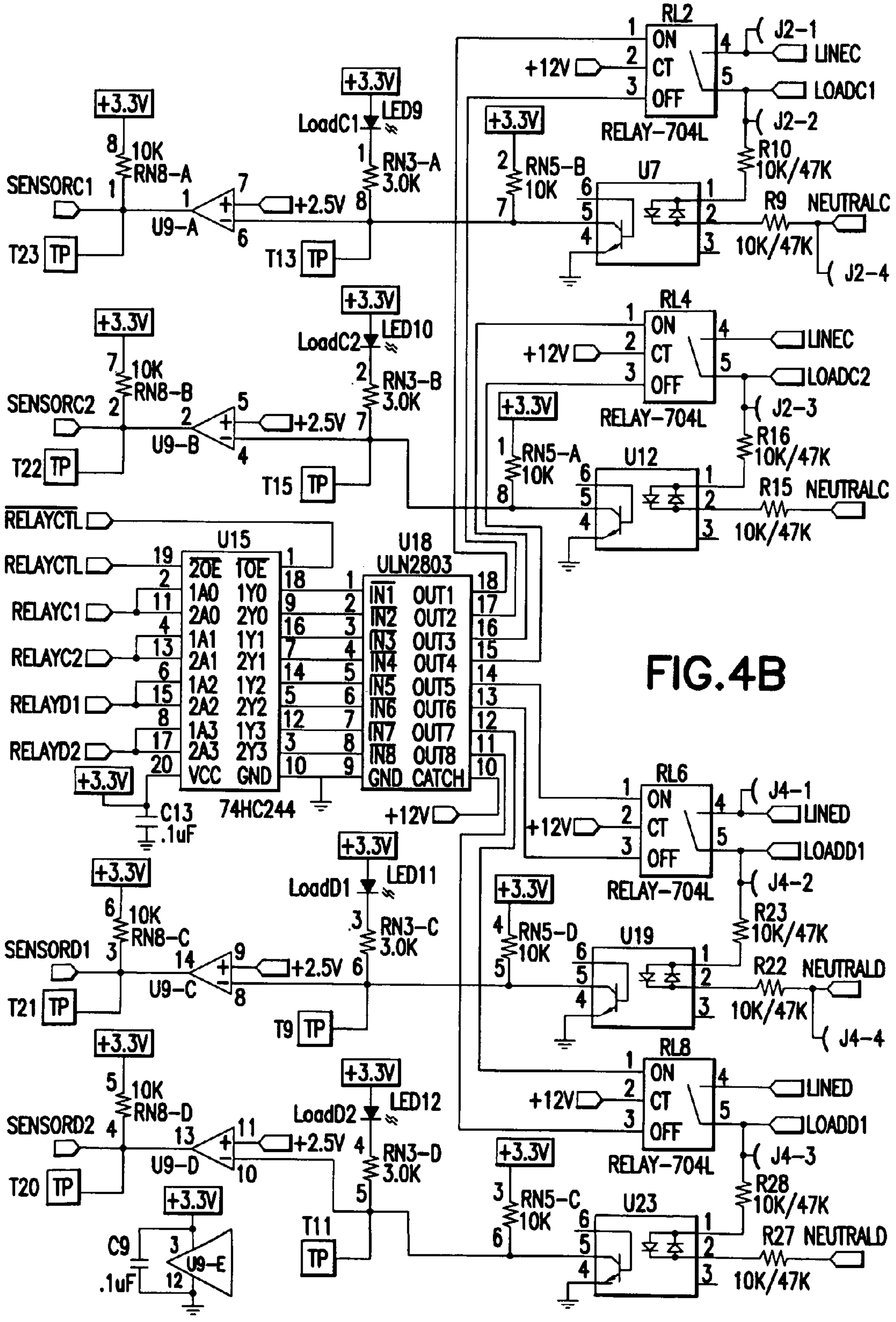
Figure 5:
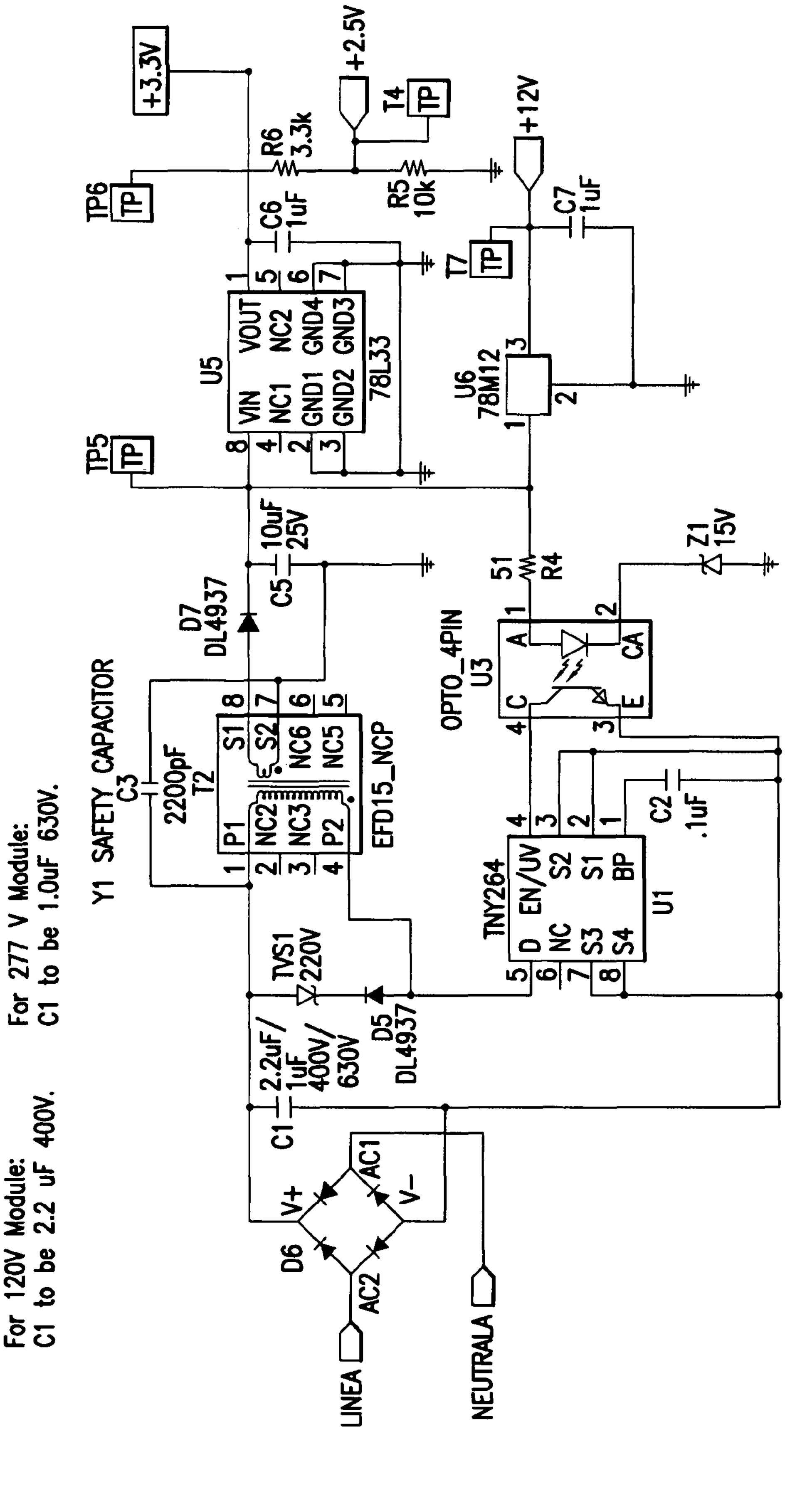

FIGS. 3-5 are schematics for one illustrative embodiment of the present disclosure for up to eight loads using zero voltage switching. Referring now to FIG. 3, a microprocessor 160 is the central logic circuit controlling the switching. Inputs 160A from the reference circuitry 162 and sensor circuitry 166 are shown. The reference circuitry 162 is shown in the upper left hand corner. The reference circuitry 162 is connected to an input line 163 from a power supply (not explicitly shown on FIG. 3).

Referring now to FIG. 4, a relay 164 is also connected to the input line 163. An output line 168 from the relay 164 is connected to a load (not shown). An optocoupler 166A and trimming comparator 166B, forming the sensor circuitry 166, are also connected to the output line 168. The optocoupler 166A sources the zero cross signals, in that whenever the output line 168 voltage is not equal to neutral, a current will flow from the optocoupler 166A to produce a signal to the microprocessor 160. The trimming comparator 166B trims the curved output signal from the optocoupler 166A into a sharp rising and falling edge for providing a consistent timing trigger. The threshold can be adjusted to provide a narrower or wider signal around the zero cross as needed for better precision. Table 1 provides a parts list for FIGS. 3-5:

TABLE 1

| QTY | REFERENCE | DESCRIPTION | VALUE |
|---|---|---|---|
| 1 | U20 | HEX SCHMITT-TRIGGER INVERTER | 74HC14 |
| 2 | U14-15 | OCTAL BUS TRANSCEIVER 3 STATE | 74HC244 |
| 1 | U11 | 16-BIT MICROPROCESSOR | MSP430 |
| 2 | U8-9 | QUAD COMPARATOR | LM339 |
| 1 | U13 | 2.7 V RESET W/WATCHDOG AND EEPROM | X5043 |
| 8 | U4 U7 U10 U12 U16 U19 U21 U23 | AC INPUT OPTO-ISOLATED TRANSISTOR | H11AA4 |
| 1 | U2 | Darlington output 1 us/7 us | 6N139 |
| 1 | Q1 | NPN, PNP TRANSISTOR PAIR | MBT3946 |
| 1 | U3 | OPTO-TRANSISTOR, 4-PIN, SMT | H11A817B |
| 2 | U17-18 | TRANSISTOR ARRAY | ULN2803LW |
| 1 | U1 | LOW POWER OFF-LINE SWITCHER | TNY264 |
| 1 | U5 | 3.3 V REGULATOR SOIC-8 | 78L33 |
| 1 | U6 | 12 V REGULATOR DPAK | 78M12 |
| 1 | U22 | DIFFERENTIAL TRANSCEIVER | MAX3486 |
| 4 | TVS2-5 | MOV SURGE ABSORBER V14D241/V14D621 | 150 VAC |
| 2 | TVS6-7 | BIDIRECTIONAL TVS | 5.6 V |
| 1 | TVS1 | TRANSIENT VOLTAGE SUPPRESSOR | 220 V |

TABLE 1-continued

| QTY | REFERENCE | DESCRIPTION | VALUE |
|---|---|---|---|
| 1 | C5 | CAPACITOR, TANTALUM, 25 V | 10 uF |
| 2 | C6-7 | 1206 CAPACITOR 1 UF | 1 uF |
| 11 | C2 C4 C8-16 | 0603 CAPACITOR .1 UF | .1 uF |
| 1 | C1 | HOLDING CAPACITOR | 2.2 uF |
| 1 | C3 | Y1 SAFETY CAPACITOR | 2200 pF |
| 4 | R1-2 R18-19 | RESISTOR, SM 2010 | 56K |
| 5 | R3 R5 R12 R17 R24 | 0603 RESISTOR 5% 10K | 10K |
| 1 | R4 | 0805 RESISTOR 51 OHM | 51 |
| 7 | RN10 RN4-9 | 4 DISCRETE RESISTOR NETWORK 0603 | 10K 10K |
| 4 | RN1-3 RN11 | 4 DISCRETE RESISTOR NETWORK 0603 | 3.0K |
| 16 | R7-10 R13-16 R20-23 R25-28 | RESISTOR, SM 2512 | 10K/47K |
| 1 | R11 | 0603 RESISTOR 5% 2.2K | 2.2K |
| 1 | R6 | 0603 RESISTOR 5% 3.3K | 3.3K |
| 1 | T2 | TRANSFORMER | EFD-15 |
| 8 | RL1-8 | DOUBLE COIL LATCHING RELAY | 12 V Coil |
| 1 | SW1 | 8 SWITCH DIP SWITCH | |
| 1 | Y1 | CERAMIC RESONATOR WITH CAPS | 7.3728 MHz |
| 6 | D1-5 D7 | Diode - MELF, 600 V | DL4937 |
| 1 | Z1 | ZENER DIODE, 15 V SMB | 15 V |
| 1 | CR1 | DUAL HEAD-TO-TAIL DIODE PACKAGE | DAN217 |
| 14 | LED1-14 | LED, SURFACE MOUNT 1206 PKG | |
| 1 | D6 | RECTIFIER 1 AMP SM | DF08S |
| 1 | J6 | CONNECTOR, 14 PIN MINIFIT | |
| 4 | J2-5 | CONNECTOR, MALE POSITRONIC | |
| 1 | J1 | 14 PIN 2-ROW HEADER .100 SPACING | |

Figure 6A:
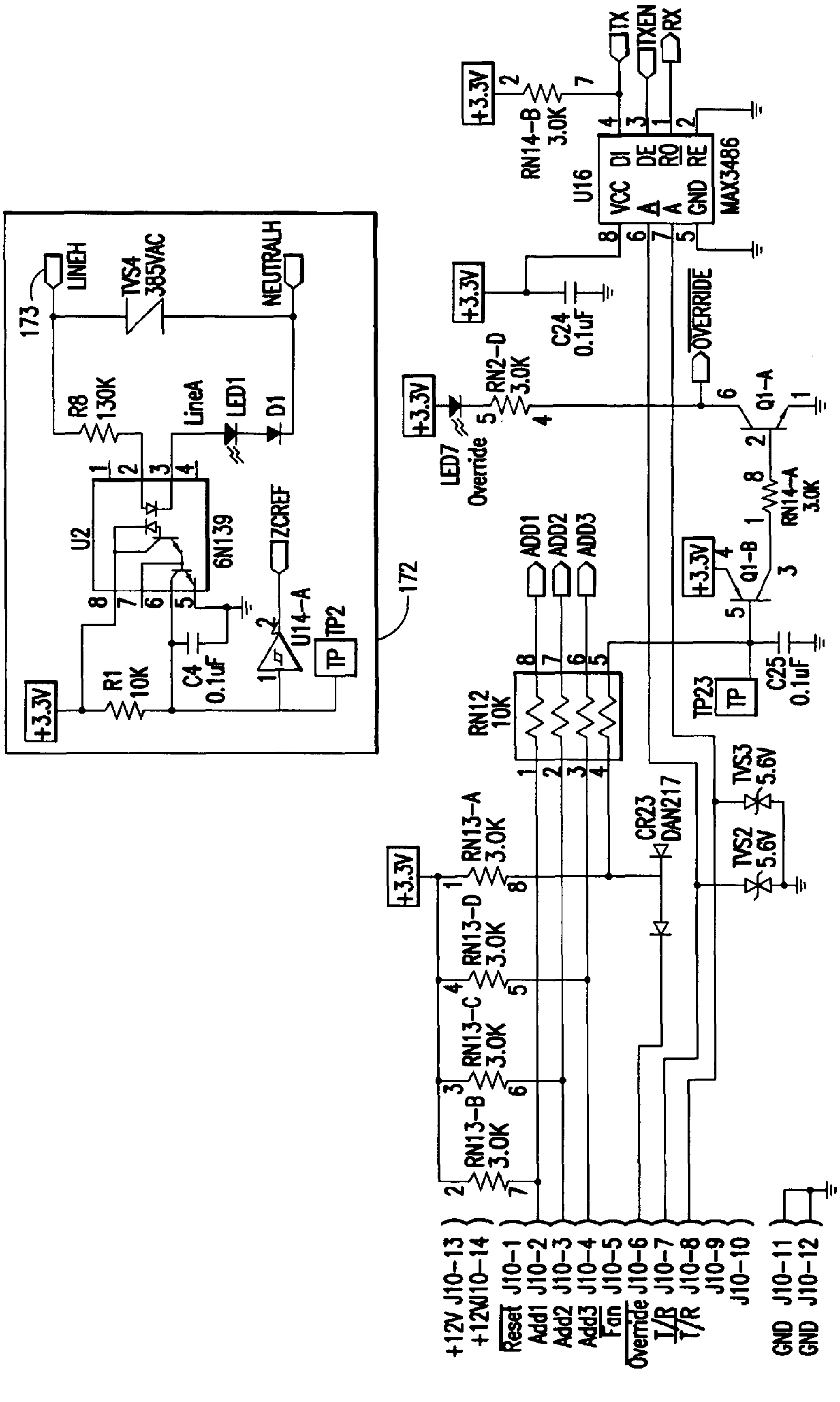
FIGS. 6-8 are schematics of a second exemplary embodiment of the system in FIG. 1.
Figure 7A:
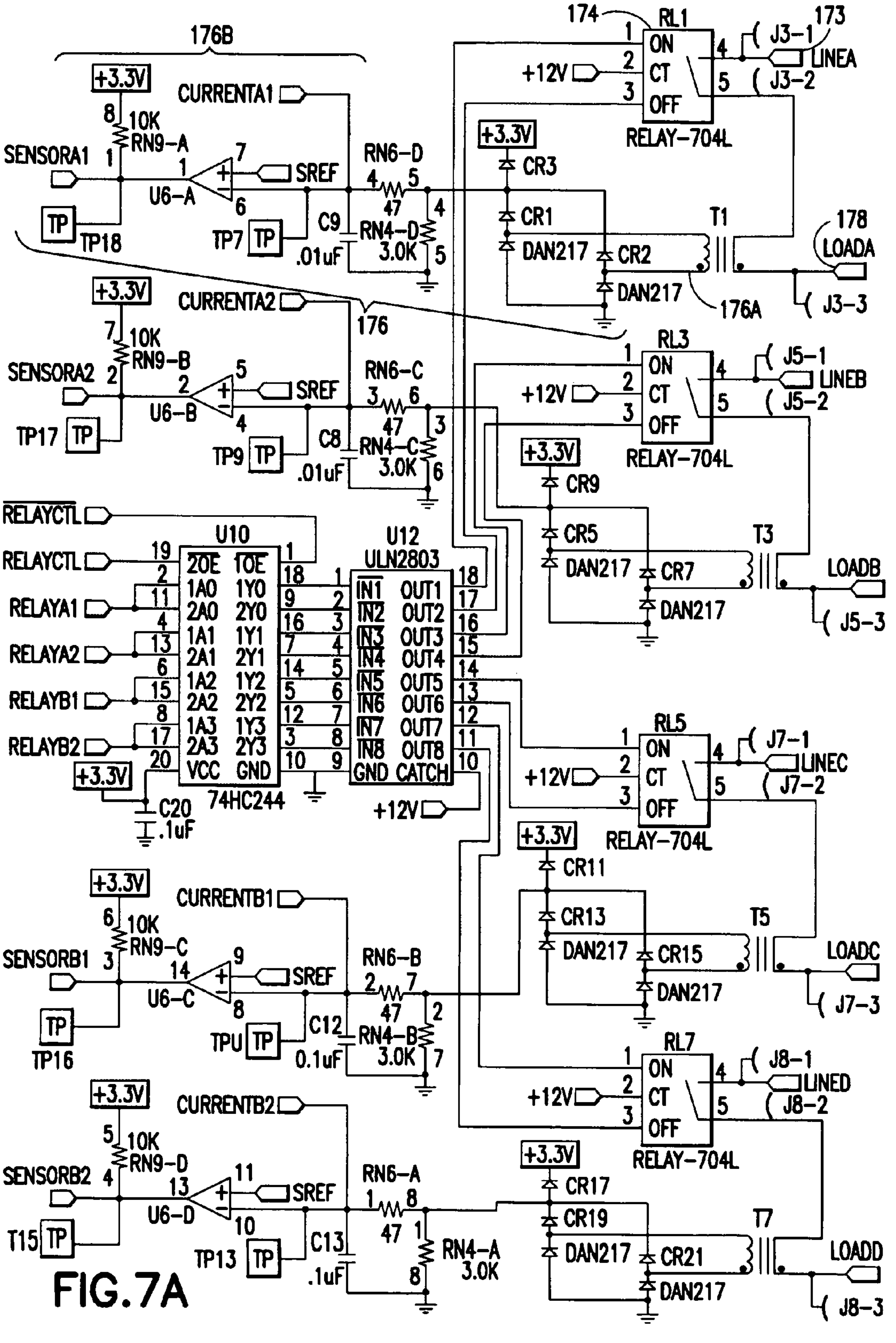
Figure 7B:
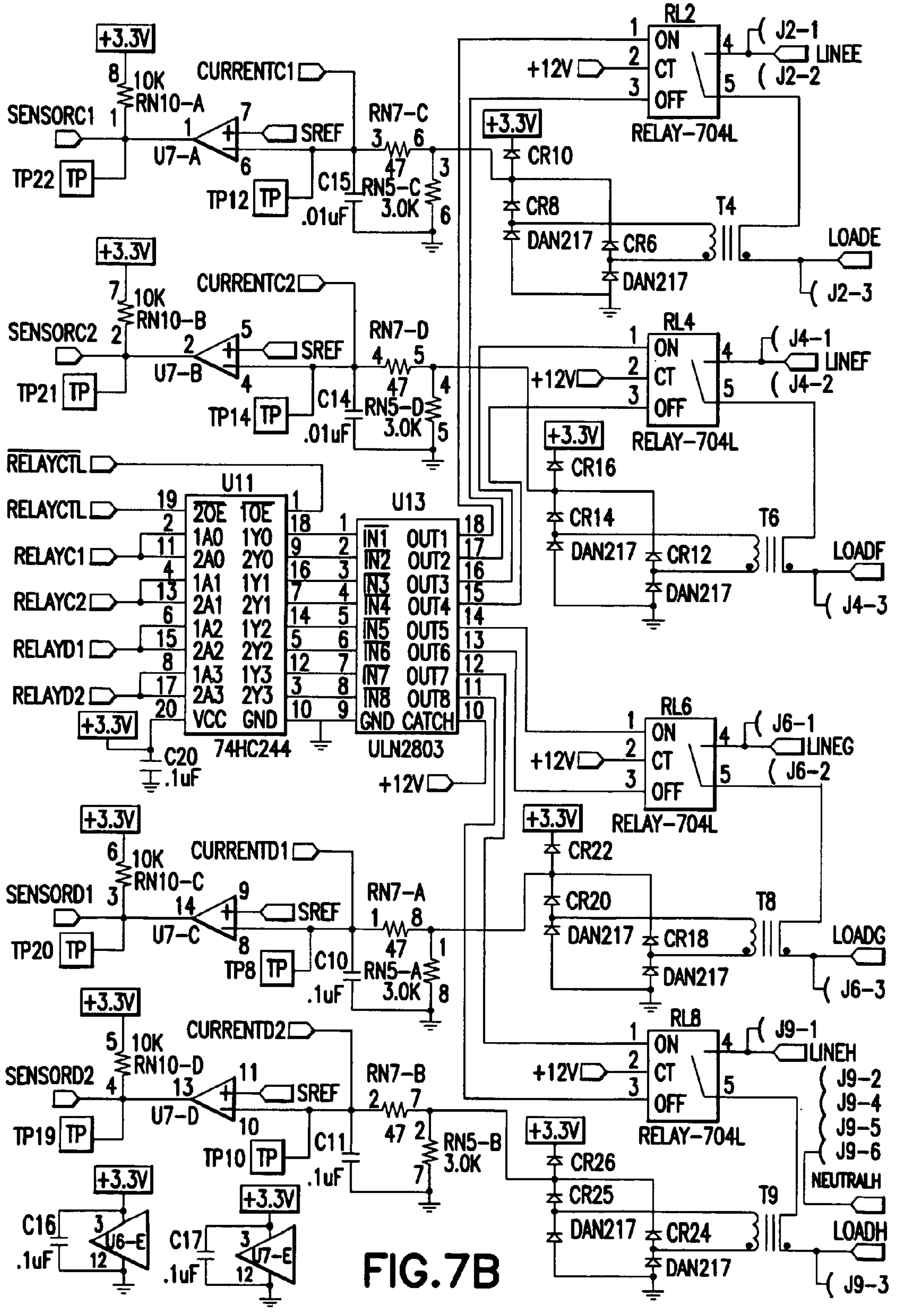
Figure 8:
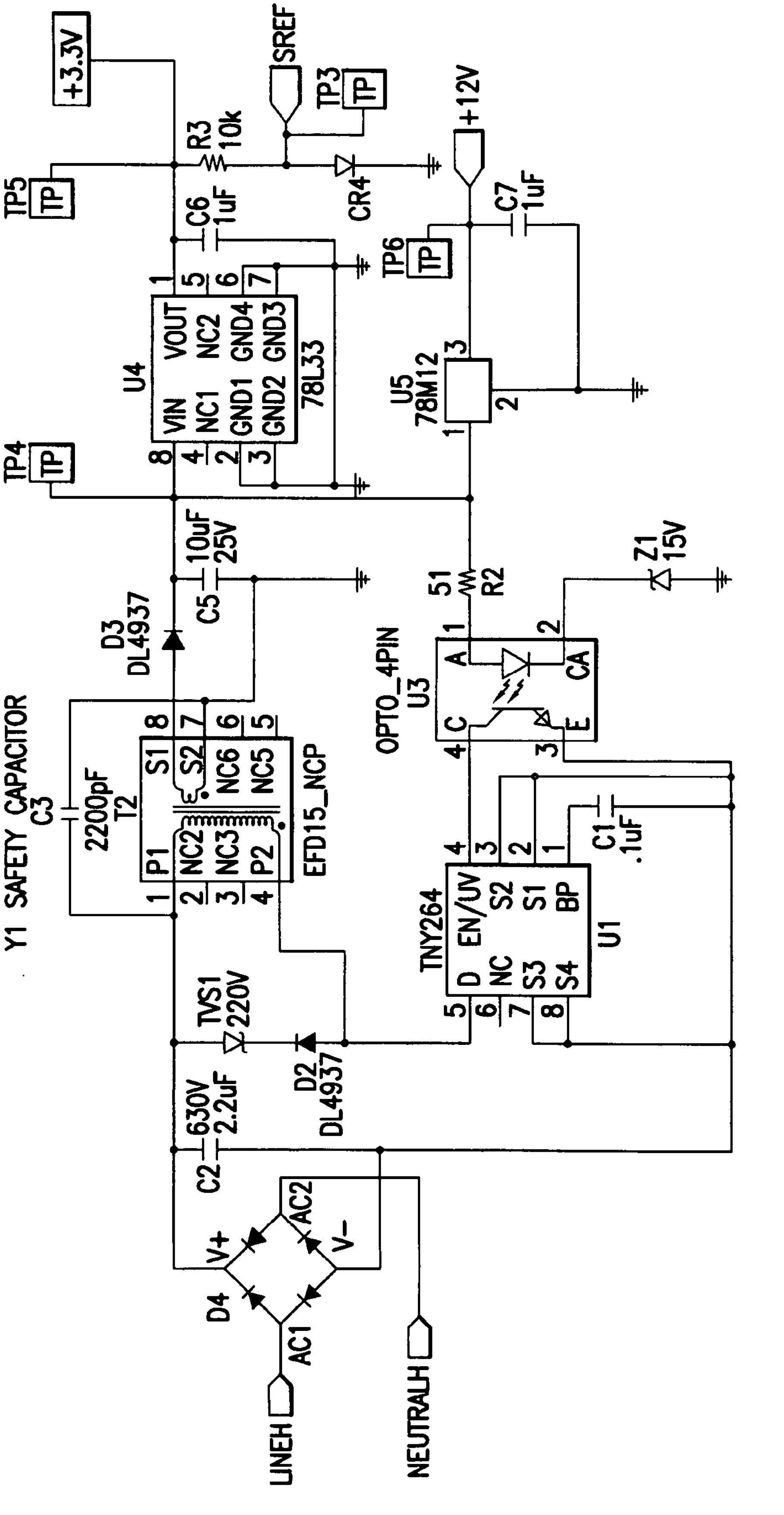

FIGS. 6-8 are schematics of one illustrative embodiment of the present disclosure for up to eight loads using zero current switching. Referring to FIG. 6, a microprocessor 170 is the central logic circuit controlling the switching. Inputs 170A from the reference circuitry 172 and sensor circuitry 176 are shown. The reference circuitry 172 is shown in the upper right hand corner. The reference circuitry 172 is connected to an input line 173 from a power supply (not explicitly shown in FIG. 6).

Referring now to FIG. 7, a relay 174 is also connected to the input line 173. An output line 178 from the relay 174 is connected to a load (not explicitly shown in FIG. 7). A current sense transformer 176A and trimming comparator 176B, forming the sensor circuitry 176, are also connected to the output line 168, The current sense transformer 176A sources the zero cross signals, in that whenever the output line 168 current is not equal to neutral, a current will flow from the current sense transformer 176A to produce a signal to the microprocessor 170. The trimming comparator 176B trims the curved output signal from the current sense transformer 176A into a sharp rising and falling edge for providing a consistent timing trigger. The threshold can be adjusted to provide a narrower or wider signal around the zero cross as needed for better precision. Table 2 provides a parts list for FIGS. 6-8:

TABLE 2

| QTY | PART NO | REFERENCE | DESCRIPTION | VALUE |
|---|---|---|---|---|
| 1 | VAA-0010 | U14 | HEX SCHMITT-TRIGGER INVERTER | 74HC14 |
| 1 | VAA-0015 | U15 | QUAD 2-INPUT POS-NAND GATE | 74VHC00 |
| 2 | VAA-0024 | U10-11 | OCTAL BUS TRANSCEIVER 3 STATE | 74HC244 |
| 1 | VAB-0033 | U8 | 16-BIT MICROPROCESSOR | MSP430 |
| 2 | VAZ-0006 | U6-7 | QUAD COMPARATOR | LM339 |
| 1 | VAZ-0009 | U9 | RESET W/WATCHDOG AND EEPROM | X5043 |
| 1 | VBF-0021 | U2 | Darlington output 1 us/7 us | 6N139 |
| 1 | VBF-0040 | Q1 | PNP, NPN DUAL TRANSISTOR | MBT3946 |
| 1 | VBF-0041 | U3 | OPTO-TRANSISTOR, 4-PIN, SMT | H11A817B |
| 2 | VBF-0044 | U12-13 | TRANSISTOR ARRAY | ULN2803LW |
| 1 | VBF-0049 | U1 | LOW POWER OFF-LINE SWITCHER | TNY264 |
| 1 | VBH-0016 | U4 | 3.3 V REGULATOR SOIC-8 | 78L33 |
| 1 | VBH-0017 | U5 | 12 V REGULATOR DPAK | 78M12 |
| 1 | VBI-0010 | U16 | DIFFERENTIAL TRANSCEIVER | MAX3486 |
| 2 | VBZ-0003 | TVS2-3 | BIDIRECTIONAL TVS | 5.6 V |
| 1 | VBZ-0018 | TVS1 | TRANSIENT VOLTAGE SUPPRESSOR | 220 V |
| 1 | VBZ-0020 | TVS4 | MOV SURGE ABSORBER | 385 VAC |
| 1 | VCA-0002 | C5 | CAPACITOR, TANTALUM, 25 V | 10 uF |
| 2 | VCA-0013 | C6-7 | 1206 CAPACITOR 1 UF | 1 uF |
| 12 | VCA-0043 | C1 C4 C16-25 | 0605 CAPACITOR .1 UF | .1 uF |
| 8 | VCA-0061 | C8-15 | 0603 CAPACITOR .01 UF | .01 uF |
| 1 | VCA-0109 | C2 | HOLDING CAPACITOR | 2.2 uF |
| 1 | VCA-0093 | C3 | Y1 SAFETY CAPACITOR | 2200 pF |
| 1 | VCB-0050 | R8 | RESISTOR, ½ W SURFACE MOUNT | 130K |
| 5 | VCB-0134 | R1 R3 R5-7 | 0603 RESISTOR 5% 10K | 10K |
| 1 | VCB-0162 | R2 | 0805 RESISTOR 51 OHM | 51 |
| 1 | VCB-0165 | RN12 | 4 RESISTOR SM NETWORK 0603 | 1.0K |
| 4 | VCB-0167 | RN8-11 | 4 RESISTOR SM NETWORK 0603 | 10K |
| 6 | VCB-0169 | RN1-5 RN13 | 4 RESISTOR SM NETWORK 0603 | 3.0K |
| 1 | VCB-0187 | R4 | 0805 RESISTOR 2.2K | 2.2K |
| 2 | VCB-0205 | RN6-7 | 4 RESISTOR SM NETWORK 0603 | 47 |
| 1 | VCC-0014 | T2 | FLYBACK TRANSFORMER | EFD-15 |
| 8 | VCC-0024 | T1 T3-9 | CURRENT SENSE TRANSFORMER | FIS125 |
| 8 | VCF-0005 | RL1-8 | DOUBLE COIL LATCHING RELAY | 12 V Coil |
| 1 | VCG-0007 | SW1 | 8 SWITCH DIP SWITCH | |

TABLE 2-continued

| | | | | |
|---|---|---|---|---|
| 1 | VCK-0012 | Y1 | CERAMIC RESONATOR WITH CAPS | 7.3728 MHz |
| 3 | VCL-0002 | D1-3 | Diode - MELF, 600 V | DL4937 |
| 1 | VCL-0004 | Z1 | ZENER DIODE, 15 V SMB | 15 V |
| 17 | VCL-0007 | CR1-2 CR5-8 CR12-15 CR18-21 CR23-25 | DUAL HEAD-TO-TAIL DIODE PACKAGE | DAN217 |
| 11 | VCL-0008 | LED1-11 | LED, SURFACE MOUNT 1206 PKG | |
| 9 | VCL-0019 | CR3-4 CR9-11 CR16-17 CR22 CR26 | DOIDE, SM SOD123 | BAS16 |
| 1 | VCL-0027 | D4 | RECTIFIER 1 AMP SM | DF06S |
| 1 | VDC-0004 | J10 | CONNECTOR, 14 PIN MINIFIT | |
| 1 | VDC-0023 | J1 | 14 PIN 2-ROW HEADER .100 | |
| 7 | VDC-0039 | J2-8 | CONNECTOR, 3 PIN | |
| 1 | VDC-0147 | J9 | CONNECTOR, POSITRONIC | |

(8-LINE RELAY MODULE)

| QTY | PART NO | DESCRIPTION |
|---|---|---|
| 1 | VDB-0113 | 8-LINE RELAY MODULE PC BOARD |
| 1 | VEC-0100 | COMMERCIAL RELAY MODULE CUSTOM LABEL |
| 1 | VEC-0101 | COMMERICAL RELAY RIGHT LED CUSTOM LABEL |
| 1 | VEC-0114 | COMMERICAL RELAY LEFT LED CUSTOM LABEL |
| 1 | VHA-0053 | RELAY MODULE TOP SHIELD |
| 1 | VHA-0054 | COMMERCIAL RELAY MODULE BOTTOM SHIELD |
| 1 | VHB-0007 | SHIELD SIDE INSULATOR |
| 8 | VHD-0015 | 6-32 × ¼" TORX PANHEAD STEEL ZINC |

Figure 9:
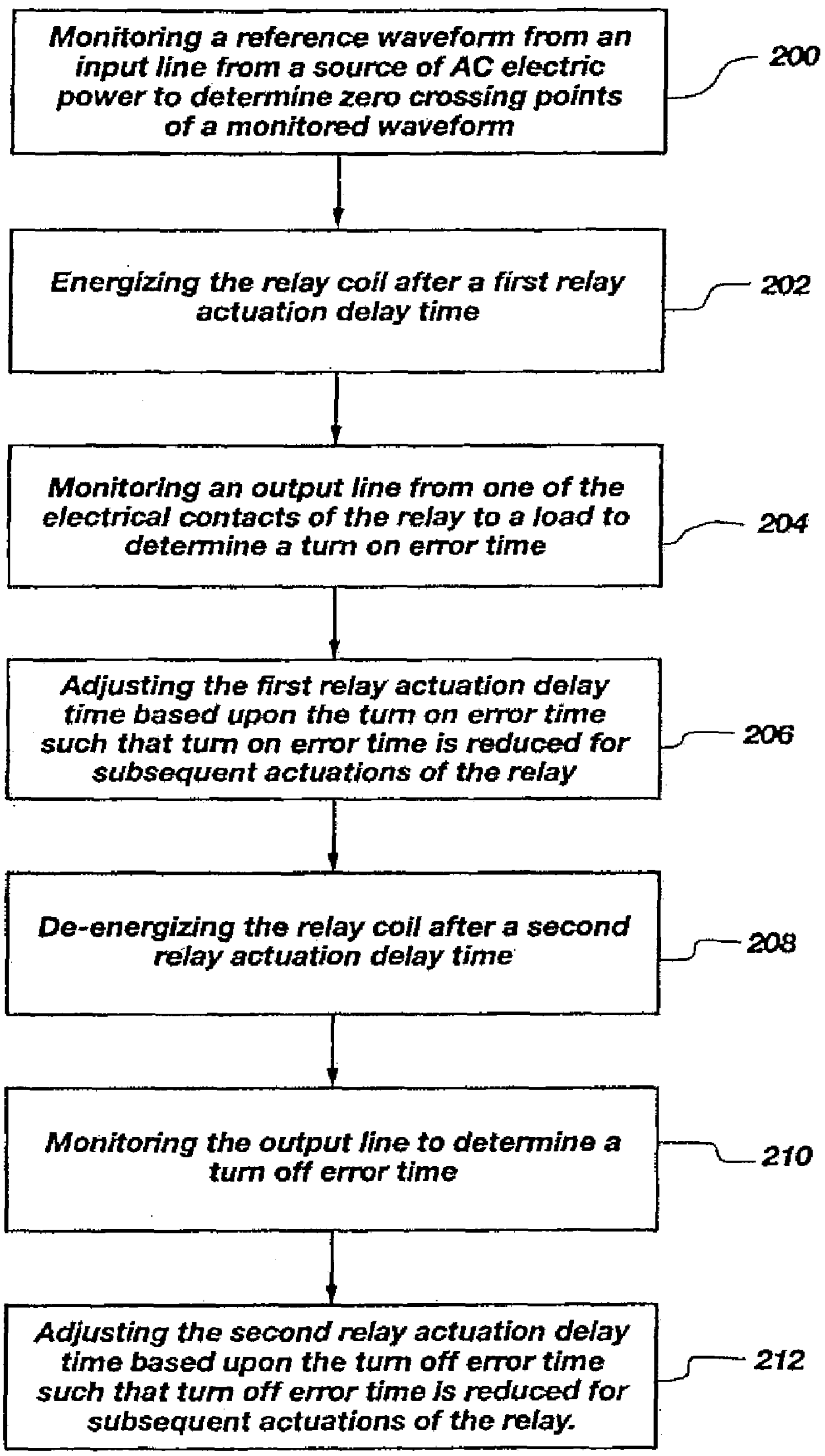
FIG. 9 is a flow chart showing illustrative steps taken in carrying out an exemplary method for adjusting relay actuation delay for a relay system such as the system in FIG. 1.

In accordance with the features and combinations described above, a useful method, as shown in FIG. 9, of switching a relay includes the steps of monitoring a reference waveform from an input line from a source of AC electric power to determine zero crossing points of a monitored waveform {step 200). Next, the relay coil is energized after a first relay actuation delay time (step 202). An output line from one of the electrical contacts of the relay to a load is monitored to determine a turn on error time (step 204).

Based upon the results from the previous step, the first relay actuation delay time is adjusted based upon the turn on error time such that turn on error time is reduced for subsequent actuations of the relay (step 206). Upon a command to turn the load controlled by the relay off, the next step is de-energizing the relay coil after a second relay actuation delay time (step 208). Again, the next step is monitoring the output line to determine a turn off error time (step 210). The final step is adjusting the second relay actuation delay time based upon the turn off error time such that turn off error time is reduced for subsequent actuations of the relay (step 212).

Figure 10:
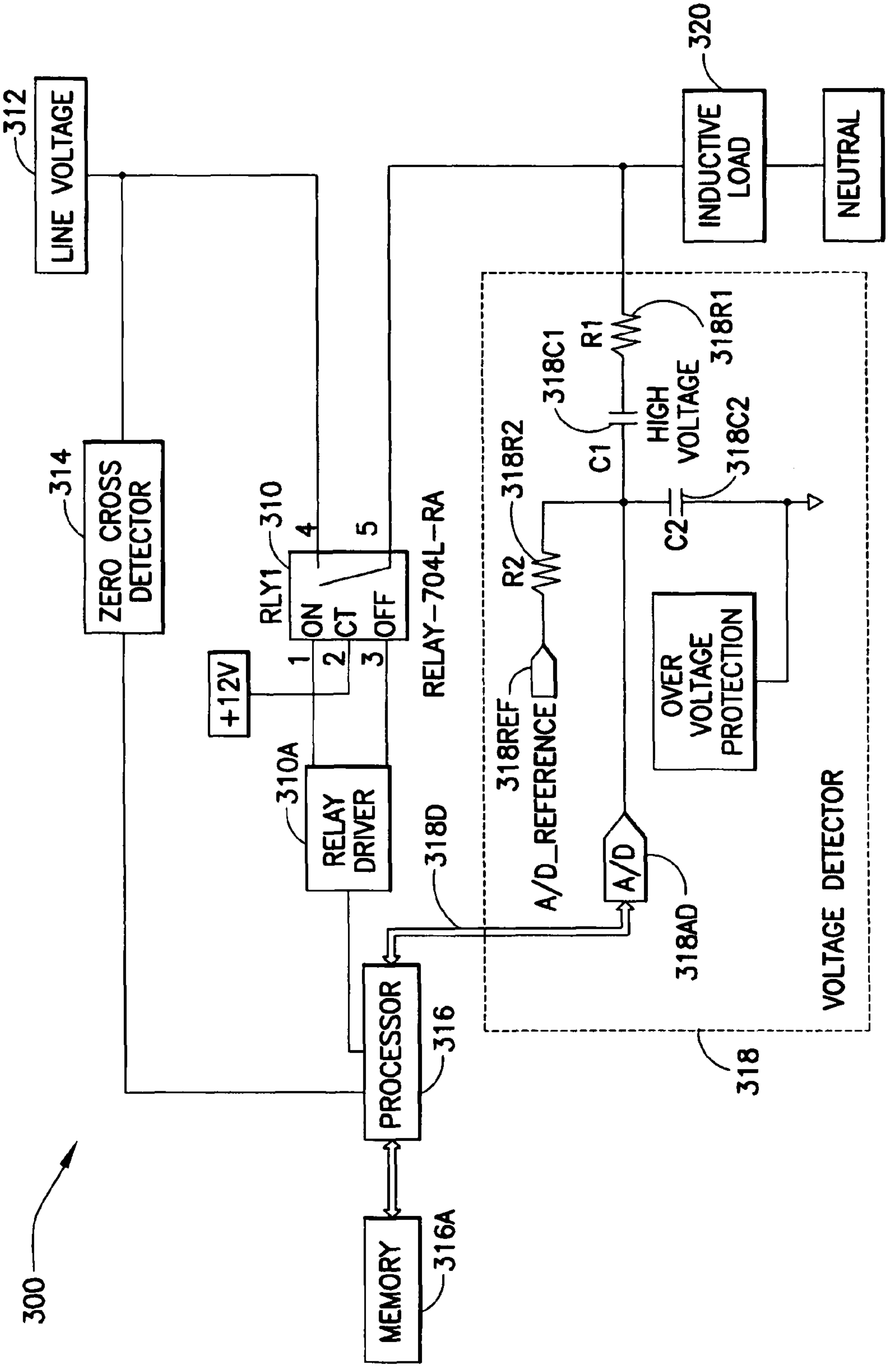
FIG. 10 is a block diagram of an exemplary embodiment of the system in FIG. 1, wherein the sensor circuit is a voltage detector or monitor or the like, and wherein the inductive kickback effect on the load voltage signal is analyzed to effect current zero cross switching.

Referring now to FIG. 10, an exemplary system 300 for current zero cross switching is depicted in block diagram format. The system 300 typically includes a relay 310, an input line 312, reference circuitry 314, a processor 316, sensor circuitry 318, and a load 320. The input line 312 typically comprises an alternating current (AC) which may be at any selected frequency. The input line 312 includes a line voltage power source that is controlled/switched by the relay 310.

The relay 310 may be any type as is commonly used in the art to provide an electromechanical switch between an input line 312 and a load 320. In one embodiment and as shown in FIG. 10, the relay 310 is coupled with a relay driver 310A. During operation the relay driver 310A receives a control signal from the processor 316 and switches the relay 310 on or off.

In exemplary embodiments, the load 320 is an inductive load whereby current zero cross and voltage zero cross may be out of phase. Thus, since zero voltage does not necessarily correspond with zero current across the relay 310, line voltage zero cross may not effectively be used to determine relay open times. Rather, the system 300 analyzes the inductive kickback effect on the load voltage signal in order to effect current zero cross switching.

In order to switch the relay 310 at the current zero cross, independent sensor circuitry 318 is used to monitor the load voltage signal for the relay 310. In exemplary embodiments, the sensor circuitry 318 is a voltage detector or voltage monitor or the like, although the present disclosure is not limited thereto.

In general, the voltage detector 318 includes a first capacitor 318C1 and a second capacitor 318C2. In exemplary embodiments, the first capacitor 318C1 has a low value C1 (typically around 100 pF) and high voltage capacity. The first capacitor 318C1 advantageously couples the high voltage load signal to the low operational voltage components of voltage detector. The first capacitor 318C1 should have sufficient voltage capacity to handle the maximum value of an inductive kickback in the load voltage signal. The second capacitor 318C2 is a low voltage capacitor with a value C2. Together with the first capacitor 318C1 the second capacitor 318C2 scales the voltage signal entering the analog-to-digital converter (A/D) 318AD by a factor of C2/C1. The voltage detector may also include a first resistor 318R1 which is used to filter the load voltage signal and provide protection for the first capacitor 318C1. The A/D reference 318REF coupled through second resistor 318R2 is typically a DC bias to adjust the scaled voltage signal to the center of the A/D input range.

In general, the voltage detector 318 scales, filters, and normalizes the load voltage signal for the A/D, which then digitizes the modified signal. The digitized signal 318D is then typically passed to the processor 316. In exemplary embodiments, the processor 316, memory 316A, and the A/D 318AD may be combined into a microprocessor, CPU or the like. In general, the processor analyzes the signal 318D from the voltage detector and adjusts the subsequent relay open time for the relay 310 such that inductive kickback is minimized. In exemplary embodiments, the load voltage is continuously monitored allowing for dynamic adjustment to the relay open time.

An exemplary operational method for the system 300 is provided herein. Initially the processor 316 is loaded with an estimated relay open time for the relay 310. The estimated relay open time may be determined by the time it takes an average relay to open after the control is set to open the relay. In one embodiment, the turnoff time is synchronized based off the line voltage zero cross as determined by the reference circuitry 314. Each time the relay 310 is opened, the open control signal is sent "X" seconds prior to the desired switching time, where "X" equals the relay open time.

As previously discussed, the processor 316 analyzes the digitized load voltage signal 318D in order to adjust the relay open time such that the switching time corresponds with current zero cross. For example, the processor 316 monitors elapsed time from the last voltage zero cross and the amplitude of the digitized signal 318D. The processor 316 may also track whether the last relay open occurred during a positive or a negative AC lobe in the digitized signal 318D.

In general, when the relay is opened and the current is not zero, an inductive kickback voltage is generated. The processor 316 detects this voltage spike and is able to determine when it occurred in relation to the voltage zero cross using the logic functions provided in TABLE 3:

TABLE 3

| AC Lobe Sign Subsequent To Last Relay Open | Voltage Kickback Sign | Resultant Change to Relay Open Time |
|---|---|---|
| Positive | Negative | Increase relay open time by |
| Negative | Positive | adding an error delay |
| Positive | Positive | Decrease relay open time |
| Negative | Negative | adding an error advance |

Typically, an error delay or error advance is added to the estimated relay open time to determine the subsequent relay open time. The processor 316 monitors the magnitude of the inductive kickback spikes in order to estimate the size of the error advance or delay. The closer the relay open time is to the optimal relay open time the smaller the resultant spike and, therefore, the smaller the error. By adjusting the relay open time for the last estimated error and comparing the resultant inductive kickback spike to previous kickback spikes the processor 316 is able to hone in on the optimal relay open time wherein the relay switching time corresponds to current zero cross. In exemplary embodiments, when the relay switching time corresponds to the current zero cross the inductive kickback spike will be reduced or eliminated, thus, indicating no error. The processor 316 may include any logic circuits, e.g., a programmable logic array, custom circuit, or other appropriate circuitry known in the art, for processing the relay open time adjustments as provided above. Furthermore, the processor 316 includes the appropriate input/output circuitry required for the described implementation of the present disclosure. Processor 316 may be, for example, a CPU, whereby factors such as the shape, slope, duration, etc., of each inductive kickback spike may be analyzed by the processor 316 to more precisely estimate the relay open time error.

It will be appreciated that the present disclosure includes a relay closed at a zero voltage cross and opened at a zero current cross. Alternatively, the relay could be opened just at zero current cross. The isolation circuitry allows full isolation between line and load afforded by the relay in the open position. The present disclosure may be utilized in home automation systems.

It will be appreciated that the structure and apparatus disclosed herein is merely one example of a means for sensing a zero point crossing of a reference waveform, and it should be appreciated that any structure, apparatus or system for sensing a zero point crossing of a reference waveform which performs functions the same as, or equivalent to, those disclosed herein are intended to fall within the scope of a means for sensing a zero point crossing of a reference waveform, including those structures, apparatus or systems for sensing a zero point crossing of a reference waveform which are presently known, or which may become available in the future. Anything which functions the same as, or equivalently to, a means for sensing a zero point crossing of a reference waveform falls within the scope of this element.

It will also be appreciated that the structure and apparatus disclosed herein is merely one example of a means for automatically adjusting the delay time, and it should be appreciated that any structure, apparatus or system for automatically adjusting the delay time which performs functions the same as, or equivalent to, those disclosed herein are intended to fall within the scope of a means for automatically adjusting the delay time, including those structures, apparatus or systems for automatically adjusting the delay time which are presently known, or which may become available in the future. Anything which functions the same as, or equivalently to, a means for automatically adjusting the delay time falls within the scope of this element.

It will further be appreciated that the structure and apparatus disclosed herein is merely one example of a means for sensing a zero current crossing point, and it should be appreciated that any structure, apparatus or system for sensing a zero current crossing point which performs functions the same as, or equivalent to, those disclosed herein are intended to fall within the scope of a means for sensing a zero current crossing point, including those structures, apparatus or systems for sensing a zero current crossing point which are presently known, or which may become available in the future. Anything which functions the same as, or equivalently to, a means for sensing a zero current crossing point falls within the scope of this element.

It will further be appreciated that the structure and apparatus disclosed herein is merely one example of a means for sensing a zero voltage crossing point, and it should be appreciated that any structure, apparatus or system for sensing a zero voltage crossing point which performs functions the same as, or equivalent to, those disclosed herein are intended to fall within the scope of a means for sensing a zero voltage crossing point, including those structures, apparatus or systems for sensing a zero voltage crossing point which are presently known, or which may become available in the future. Anything which functions the same as, or equivalently to, a means for sensing a zero voltage crossing point falls within the scope of this element.

Those having ordinary skill in the relevant art will appreciate the advantages provided by the features of the present disclosure. For example, it is a feature of the present disclosure to provide a relay switching circuitry capable of closing and opening the relay at zero crossings, or at least at substantially zero crossings. Another feature of the present disclosure is to provide relay switching circuitry that closes a relay at substantially zero voltage across the relay contacts and opens the same relay contacts at substantially zero current.

Although the present disclosure has been described with reference to exemplary embodiments and implementations thereof, the disclosed assemblies, systems, and methods are not limited to such exemplary embodiments/implementations. Rather, as will be readily apparent to persons skilled in the art from the description provided herein, the disclosed assemblies, systems, and methods are susceptible to modifications, alterations and enhancements without departing from the spirit or scope of the present disclosure. Accordingly, the present disclosure expressly encompasses such modification, alterations and enhancements within the scope hereof.

What is claimed:

1. A relay switching system comprising:

a. a relay having at least one pair of contacts, wherein a first contact of the pair of contacts is coupled to an AC power source, thereby forming a first coupling, and wherein a second contact of the pair of contacts is coupled to a load, thereby forming a second coupling;

b. a voltage detector, in communication with the second coupling, for detecting inductive kickback in the load voltage signal across the second coupling;

c. a reference circuit, in communication with the first coupling, for detecting voltage zero cross for the line voltage signal across the second coupling;

d. a relay driver, in communication with the relay, for switching the relay in response to a control signal; and e. a processor in communication with the voltage detector, the reference circuit, and the relay driver, the processor configured to produce a control signal at a time T, wherein T is X time units prior to the next voltage zero cross for the line voltage signal;

wherein the processor continuously adjusts X by adding an error value, and wherein the processor calculates the error value by analyzing the inductive kickback in the load voltage signal; and wherein the processor calculates the sign of the error value based on the sign of the inductive kickback in the load voltage signal and the sign of the line voltage signal subsequent to the last switching.

2. The system of claim 1, wherein X is initially set to approximate the time it would take the relay driver to switch the relay after the control signal is produced.

3. The system of claim 1, wherein the voltage detector filters, scales, and normalizes the load voltage signal.

4. The system of claim 1, wherein the processor adjusts X separately depending on whether the pair of contacts is being opened or closed.

5. The system of claim 1, wherein the voltage detector is electrically isolated from the AC power source.

6. A method for switching a relay comprising the steps of:

a. providing a relay having at least one pair of contacts, wherein a first contact of the pair of contacts is coupled to an AC power source, thereby forming a first coupling, and wherein a second contact of the pair of contacts is coupled to a load, thereby forming a second coupling;

b. providing a relay driver, in communication with the relay, for switching the relay in response to a control signal;

c. determining time, T, for producing a control signal, wherein T is X time units before the time of the next voltage zero cross for the line voltage signal across the second coupling;

d. switching the relay by producing a control signal at time T;

e. calculating an error value for X by analyzing inductive kickback in the load voltage signal across the second coupling; and f. adjusting X and T by adding the error value to X;

wherein the sign of the error value is calculated based on the sign of the inductive kickback in the load voltage signal and the sign of the line voltage signal subsequent to the last switching.

7. The method of claim 6, wherein X is initially set to approximate the time it would take a relay driver to switch a relay after a control signal is produced.

8. The method of claim 6, wherein a processor is used to calculate the error value and produce the control signal.

9. The method of claim 8, wherein the processor adjusts X separately depending on whether the switching is opening or closing the pair of contacts.

10. The method of claim 6, wherein a voltage detector is used to detect the inductive kickback in the load voltage signal; and wherein the voltage detector is electrically isolated from the AC power source.

11. The method of claim 10, wherein the voltage detector filters, scales, and normalizes the load voltage signal.

12. The method of claim 6, wherein a reference circuit is used to detect voltage zero cross for the line voltage signal.

13. The system of claim 1, wherein when the sign of the inductive kickback in the load voltage signal is negative and the sign of the line voltage signal subsequent to the last switching is positive, the sign of the error value is positive;

wherein when the sign of the inductive kickback in the load voltage signal is positive and the sign of the line voltage signal subsequent to the last switching is negative, the sign of the error value is positive;

wherein when the sign of the inductive kickback in the load voltage signal is positive and the sign of the line voltage signal subsequent to the last switching is positive, the sign of the error value is negative; and wherein when the sign of the inductive kickback in the load voltage signal is negative and the sign of the line voltage signal subsequent to the last switching is negative, the sign of the error value is negative.

14. The method of claim 6, wherein when the sign of the inductive kickback in the load voltage signal is negative and the sign of the line voltage signal subsequent to the last switching is positive, the sign of the error value is positive;

wherein when the sign of the inductive kickback in the load voltage signal is positive and the sign of the line voltage signal subsequent to the last switching is negative, the sign of the error value is positive;

wherein when the sign of the inductive kickback in the load voltage signal is positive and the sign of the line voltage signal subsequent to the last switching is positive, the sign of the error value is negative; and wherein when the sign of the inductive kickback in the load voltage signal is negative and the sign of the line voltage signal subsequent to the last switching is negative, the sign of the error value is negative.

* * * * *